(12) United States Patent
Kremen

(10) Patent No.: US 7,002,749 B2
(45) Date of Patent: Feb. 21, 2006

(54) MODULAR INTEGRAL MAGNIFIER

(76) Inventor: Stanley H. Kremen, 4 Lenape La., East Brunswick, NJ (US) 08816

( * ) Notice: Subject to any disclaimer, the term of this patent is extended or adjusted under 35 U.S.C. 154(b) by 54 days.

(21) Appl. No.: 10/904,745

(22) Filed: Nov. 24, 2004

(65) Prior Publication Data

US 2005/0088749 A1    Apr. 28, 2005

Related U.S. Application Data

(63) Continuation-in-part of application No. 10/292,137, filed on Nov. 12, 2002, which is a continuation of application No. 09/749,984, filed on Dec. 27, 2000, now Pat. No. 6,593,958, which is a continuation of application No. 09/111,990, filed on Jul. 8, 1998, now Pat. No. 6,229,562.

(60) Provisional application No. 60/051,972, filed on Jul. 8, 1997.

(51) Int. Cl.
*G02B 27/10* (2006.01)

(52) U.S. Cl. .................. 359/619; 359/621; 348/51

(58) Field of Classification Search ............... 359/618, 359/619, 621–623, 19; 348/51; 345/419
See application file for complete search history.

(56) References Cited

U.S. PATENT DOCUMENTS

| | | | | |
|---|---|---|---|---|
| 4,072,395 A | * | 2/1978 | Mohon | 359/19 |
| 6,115,059 A | * | 9/2000 | Son et al. | 348/46 |
| 6,593,958 B1 | * | 7/2003 | Kremen | 348/51 |
| 2005/0002105 A1 | * | 1/2005 | Nemoto et al. | 359/619 |

* cited by examiner

*Primary Examiner*—Huy Mai

(57) ABSTRACT

A Modular Integral Magnifier that produces a uniformly magnified orthoscopic three-dimensional image of an original three-dimensional scene. The optical elements to achieve this effect are always maintained in relative alignment and registration regardless of movement and temperature deformations. The modules may be used together to construct a large composite high resolution viewing aperture or screen for large audiences to observe the magnified three-dimensional image. It may be used with photography, videography, or optical imaging of live scenes. It may be used for both still-life and animated three-dimensional images.

61 Claims, 18 Drawing Sheets

MODULAR INTEGRAL MAGNIFIER

CROSS REFERENCE TO RELATED APPLICATIONS

This U.S. Non-Provisional patent application is a continuation-in-part of and claims the benefit of pending U.S. Non-Provisional application Ser. No. 10/292,137 (published as U.S. 2003-0160864 A1) filed on Nov. 12, 2002, entitled SYSTEM AND APPARATUS FOR RECORDING AND PROJECTING 3-DIMENSIONAL IMAGES (hereinafter the 137-Application); which in-turn is a continuation of and claims the benefit of U.S. Non-Provisional application Ser. No. 09/749,984 filed on Dec. 27, 2000 (having matured into U.S. Pat. No. 6,593,958 issued on Jul. 15, 2003—hereinafter the 958-Patent) entitled SYSTEM, APPARATUS AND METHOD FOR THE RECORDING AND PROJECTION OF IMAGES IN SUBSTANTIALLY 3-DIMENSIONAL FORMAT (hereinafter the 984-Application); which in-turn is a continuation of and claims the benefit of U.S. Non-Provisional application Ser. No. 09/111,990 (hereinafter the 990-Application) filed on Jul. 8, 1998 (having matured into U.S. Pat. No. 6,229,562 issued on May 8, 2001—hereinafter the 562-Patent) entitled SYSTEM, APPARATUS AND METHOD FOR THE RECORDING AND PROJECTION OF IMAGES IN SUBSTANTIALLY 3-DIMENSIONAL FORMAT; which in-turn claims the benefit of U.S. Provisional Application No. 60/051,972 filed on Jul. 8, 1997 (hereinafter the Provisional Application). All of said patent applications and patents are incorporated in their entirety herein by reference thereto. Applicant hereby claims the benefit of the earliest priority date of Jul. 8, 1997 for the cited U.S. applications and patents. Collectively, all of said patents and applications that form the basis for the Present Invention and are incorporated herein by reference are hereinafter referred to as the Claimed Priority Patents and Applications.

BACKGROUND OF INVENTION

This section discusses the teachings of the relevant prior art as well as the Claimed Priority Patents and Applications that form the basis for the Present Invention.

DISCUSSION OF THE PRIOR ART

People perceive depth because they have two eyes. Because their eyes are separated horizontally by an inter-occular distance, every scene is viewed as a composite of two separate two-dimensional images. The two images are different from each other since they each represent the scene from a slightly different viewpoint. The human brain reconciles the differences between the two images by combining them into a three-dimensional view.

Artistic and photographic display of three-dimensional images of scenes is not new. Stereoscopy was discovered during the nineteenth century. In June 1833, Charles Wheatstone revealed the technology during a lecture to the Royal Society of London. In 1838, he published his theory of stereopsis and proposed a stereoscopic viewer. With this technology, each eye is allowed to see a slightly different two-dimensional picture. Each of the two pictures represents a two-dimensional projection of the same three-dimensional scene taken from two different viewpoints, preferably separated by the inter-occular distance. The viewer's brain is thus fooled into perceiving a three-dimensional scene.

In 1849, David Brewster invented the first practical stereoscope. Initially, stereoscopes were used to view cards containing drawn and painted artistic renditions of three-dimensional scenes. By the late nineteenth century, the drawings and paintings were replaced with photographic stereoscopic pairs. Stereoscopes are still used today. However, two developments advanced the technology of stereoscopic three-dimensional display. The first was the use of filters to separate the stereoscopic pairs for presentation to each eye separately. The filters were mounted on spectacles to be worn by the viewer. The anaglyphic process used red and blue filters, while the vectographic and 3-D processes used filters of differing polarity. If a viewer were to wear the special glasses, he could observe still and moving pictures in full three-dimensions. 3-D movies were popular during the late 1950s, and they are still occasionally shown today. However, they are not currently popular.

The second development was the lenticular stereogram. In 1903, U.S. Pat. No. 725,587 was issued to Frederick E. Ives for a parallax stereogram. This first autostereoscopic method used a "barrier technique" which involved dividing two or more pictures into stripes and aligning them behind vertically aligned slits of the same frequency. Eventually, a lenticular sheet of cylindrical lenses, with their long axes positioned vertically, was placed in contact with an unexposed photographic plate. Two stereoscopic pictures were exposed on the plate through the lenticular sheet. After development of the photograph, the same or equivalent lenticular sheet (sometimes referred to as a Bonnet Screen) was aligned and bonded to the photograph. A viewer was able to perceive a three-dimensional scene without the use of special glasses. This technology has been used primarily for display of still photographs.

The lenticular stereogram, being created by a stereoscopic process, could not provide a viewer with a sense of parallax. Normally, when a viewer moves his head, his viewpoint shifts. People do this when they want to look around an object to see what is behind it. Although the ability to move to be able see a scene from a different viewpoint, i.e., to observe parallax, does not contribute to the perception of three-dimensional depth, it is one of the cues that informs a viewer that a scene is real. Since a stereoscopic photographic process uses only a pair of pictures, continuous parallax is not present. This problem was solved during the 1970s when multiple cameras photographed a scene from a plurality of viewing angles and used the same technique that produces a lenticular stereogram to create a stereo-panoramagram. Now, if a viewer were to move his head horizontally, he could look around objects. Only horizontal parallax was present. However, it was not continuous. A viewer was able to observe parallax in discreet steps. As he moved his head, the viewpoint shifted suddenly. Even though parallax was present, the process was nonetheless stereoscopic. From any particular viewpoint, separate images reached each eye of the viewer individually to create the illusion of three-dimensional depth.

Stereoscopy has one severe drawback. Prolonged viewing of three-dimensional pictures produces eye strain and headaches for the viewer. When one normally views a three-dimensional scene containing objects, the viewer visually observes only a portion of the scene with a limited depth of field. The viewer's eyes both focus and converge to that portion of the scene. Everything else is somehow blurred. However, when one views stereoscopic pairs, both eyes converge to the apparent three-dimensional position of an object in view, but they focus on the actual position of the object. When viewing a 3-D movie, the eyes of the audience converge to the apparent positions of objects, but they focus on the screen. This is an unnatural viewing condition, and eye strain is inevitable. Audiences blamed the special glasses for causing their discomfort, because wearing glasses seemed to be the only difference between viewing conventional flat and 3-D movies. However, any stereoscopic process will cause the same problem whether or not glasses are used.

The use of holography as a photographic process eliminated this drawback. A hologram is not a photograph of a scene, but rather a photograph made from interfering light waves containing information about the scene. Direct observation of a hologram in the same way as one would view a photograph, yields unintelligible results. However, a hologram may be thought of as a filter that when properly illuminated produces the same light waves as though the original scene were really there. This is called wavefront reconstruction. A real or virtual image of the scene is created in space. Theoretically, a viewer cannot perform any visual test to discern whether or not the scene is real or reconstructed from a hologram. Both depth and full parallax are present. The viewer observes the scene naturally. Holography does not cause viewer eye strain. However, it is extremely difficult to produce holographic motion pictures for mass viewing.

A second photographic development was used to reconstruct three-dimensional images of scenes with almost true parallax. The first use of multiple views to form three-dimensional pictures was described by Clarence W. Kanolt in 1918 in U.S. Pat. No. 1,260,282 for his Parallax Panoramogram Camera. This technique led to the work of Douglas Winnek in the United States and Prof. Maurice Bonnet in France who both developed scanning cameras that are still used today. Here a camera with a single lens is utilized, and a Bonnet Screen is placed in front of the photographic plate. During a timed exposure, the camera is moved or the scene itself is moved. An example of a method for moving the camera is to mount it to a moving train that moves horizontally in a direction perpendicular to the line of sight. An example of a method for moving the scene is to mount it on a turntable or carousel. The photograph once developed appears to be a blurry smear. However, when viewed through a Bonnet Screen, a realistic three-dimensional image of the scene is reconstructed. These lenticular three-dimensional pictures are often displayed today. However, the process does not lend itself to creation of motion pictures.

At the beginning of the twentieth century, Gabriel Lippmann created integral photography (often called Lippmann photography). Lippmann photographed a three dimensional scene through an array of small spherical lenses known as a fly's eye lens (i.e., a matrix lens array). Each lenslet or element of the fly's eye lens produced a coherent two-dimensional elemental picture of the scene as photographed from a slightly different viewpoint. When viewed through the same fly's eye lens that was used to create the photograph, a three-dimensional reconstruction of the scene was created. The three-dimensional reconstruction was particularly impressive when the viewer was far enough away from the reconstruction as not to be able to view the lenslet elements of the fly's eye lens. The integral photograph possessed both depth and parallax. During the 1960s, R. V. Pole refined this technique, and, in 1970 was awarded U.S. Pat. No. 3,515,452 entitled: "Forming a Hologram of a Subject Recorded on an Integral Photograph With Incoherent Light." The holograms produced by Pole did not require a fly's eye lens for reconstruction of the three-dimensional image. During the early 1970s, Lloyd Cross produced integral holograms where the two-dimensional elemental pictures were frames of a motion picture film. These holograms also did not require a matrix lens array to reconstruct the three-dimensional image. Not only did they provide for horizontal parallax, but also when the viewer moved his head, the scene became animated.

When an ordinary two-dimensional photograph is cut in half, each half shows a different portion of the scene. When cut into a large number of pieces, the scene observed on each piece becomes less intelligible as the pieces become smaller. The scene can only be reconstructed in its entirety if the pieces are put together as a jigsaw puzzle. On the other hand, when a hologram is cut into a large number of pieces, each piece is capable of reconstructing the entire three-dimensional scene, albeit from a somewhat different viewing angle. Were the pieces to be made small enough as to become peep holes capable of being viewed only through one eye, even though they are each able to reconstruct a three-dimensional scene, effectively, the viewer only perceives the scene in two-dimensions. Nonetheless, parallax is continuous since a hologram may be theoretically cut into an infinite number of pieces.

An integral photograph uses wavefront reconstruction to produce a three-dimensional image of a scene. It is not viewed stereoscopically. Theoretically, parallax is discontinuous, but, if the elemental pictures are sufficiently small and if the viewer is at a sufficient distance, this will not be noticed.

Generally, three-dimensional holographic motion pictures are not suitable for viewing by large audiences. Not being photographs of a scene, they can not be projected directly onto a screen. Most transmission holograms have the appearance of merely having a large number of wavy lines. Projecting these holograms onto a screen presents to an audience an enlarged picture of these wavy lines. A. Jacobson and D. J. DeBitetto first produced holographic motion pictures during the 1970s. The discreet holographic frames comprising the motion pictures were small. Were a holographic transparency to be magnified so as to be sufficiently large so as to be displayed to audiences, the three-dimensional reconstructed image would be demagnified. On the other hand, if a three-dimensional image was first reconstructed from a hologram and then magnified, the depth magnification would be equal to the square of the lateral magnification. Although companies such as Holotron Corporation attempted to optically correct for this disproportionate magnification, they were unsuccessful in creating a viable system whereby large audiences could view three-dimensional holographic movies.

Several stereoscopic motion picture systems were developed where audiences were not required to wear special glasses. One notable system was developed in 1969 by Dennis Gabor, the inventor of the hologram. However, these systems required viewers to keep their heads in fixed positions. Furthermore, because these systems are stereoscopic, viewer eye strain is inevitable.

DISCUSSION OF THE CLAIMED PRIORITY PATENTS AND APPLICATIONS THAT FORM THE BASIS FOR THE PRESENT INVENTION

The Claimed Priority Patents and Applications disclose a system, apparatus, and method whereby integral photography can be used to create a uniformly magnified three-dimensional image of a scene. An integral photograph is created using a first matrix lens array. That photograph is then magnified either to produce a magnified integral photograph or a projected two-dimensional magnified image of the original integral photograph (i.e., an integral frame). If viewed using a second matrix lens array that has been appropriately scaled up by the same magnification factor, a uniformly magnified three-dimensional reconstruction of the scene is produced. Creation of an actual integral photograph for magnification or projection is unnecessary. The same system may be used to produce a real-time magnified three-dimensional reconstruction of a live scene. It can also be used to magnify the three-dimensional reconstruction from a holographic movie.

After disclosing the principle of magnification and projection, the Claimed Priority Patents and Applications proceeded to disclose solutions to a number of practical problems that would arise if the magnification and projection principle were implemented in some apparatus. Two notable problems were image resolution and image stability.

The Claimed Priority Patents and Applications disclose a preferred embodiment where film is the recording medium. Various novel devices and methods were disclosed that needed to be employed in the system in order to create a film frame for which projected picture resolution would be acceptable to most audiences. Among these were the elimination of vertical parallax, the use of high-resolution black-and-white film for recording pictures along with color filtering for the restoration of color, use of a larger than standard format film frame, and image multiplexing. Were videography to be used instead of photography, the image resolution difficulties would be worse. Typical resolution of commercial color film is in the order of 100 line pairs/mm. Specialty black-and-white film is available with a resolution as high as 5,000 line pairs/mm. In a standard 70-mm film frame, using a resolution figure of 100 line pairs/mm, there would be in excess of 21-million resolvable spots. Using the proposed 125-mm film frame with a resolution capability of 2,000 line pairs/mm, there would be in excess of 32.5-billion resolvable spots. By comparison, a standard NTSC television picture has a resolution capability of 307,200 pixels. Digital video still cameras are commercially available with picture resolutions between 3 and 9-million pixels.

A simple solution to the resolution problem would be to create a composite integral frame from component modules. A single component module could have sufficient resolution to reconstruct its portion of the scene. The composite picture would be assembled in a manner similar to assembling a jigsaw puzzle. The preferred embodiment of such a display would resemble a conventional video wall, the difference being that the displayed video resolution of the composite picture of a conventional video wall display may not be greater than that of the original videographed frame. Consequently, the component video resolving power is greatly reduced. On the other hand, employing the proposed solution of the Present Invention, the picture created by each component module would be displayed with a high resolution. Therefore, the magnified composite picture would have a greater resolving power than was previously available with film.

The Claimed Priority Patents and Applications also disclosed that when the recited apparatus was used for projection of motion pictures, misalignment or misregistration between successive frames of the projected image with the screen elements due to vibration or jitter would create unacceptable jitter in the magnified three-dimensional image. The Claimed Priority Patents and Applications disclosed various methods to prevent this misalignment, among them being the use of a three-point registration system to position the film during photography and display, and mounting of the camera and projector so as to reduce vibration to an acceptable limit. Material deformations due to temperature instability also creates an alignment problem requiring the addition of computer controlled alignment for the system. All of these limitations require a solution that results in an expensive implementation.

However, the modular approach discussed above could solve the image stability problem if the modules were to be constructed such that the unmagnified and magnified integral frames were always in alignment and registration with their respective optical elements and with each other. One method of accomplishing this would be to mold the optics into an encased rigid module. Another method would be to use coherent fiber optics bundles that are secured to both the input and output elements. Instability between the modules of an assembled modular display would not produce unacceptable three-dimensional image jitter.

SUMMARY OF INVENTION

The Present Invention is a Modular Integral Magnifier that accepts or creates an input two-dimensional integral frame produced from an original three-dimensional scene, and produces a uniformly magnified orthoscopic three-dimensional image of the scene. The optical elements comprising the Present Invention are always maintained in relative alignment and registration. The modules described herein may be used together to construct a large composite high resolution viewing aperture for observing the magnified three-dimensional image. The Present Invention may be used with photography, videography, or optical imaging of live scenes. It may be used for both still-life and animated three-dimensional images.

BRIEF DESCRIPTION OF DRAWINGS

FIG. 3(a) shows a rear elevational view while FIG. 3(b) shows a side elevational view.

FIG. 5(a) shows spherical elements positioned in a square matrix.

FIG. 5(b) shows spherical elements that are hexagonally close packed.

FIG. 5(c) shows rectangular elements positioned in a rectangular matrix.

FIG. 5(d) shows linearly adjacent cylindrical elements.

FIG. 5(e) shows hexagonally shaped spherical elements that are hexagonally close packed.

FIG. 5(f) shows a hexagonally close packed array of pinholes on a dark substrate.

FIG. 10(a) shows a rear elevational view while FIG. 10(b) shows a side view.

FIG. 11(a) shows an integral photograph bonded to the surface of the small planar face of the device.

FIG. 11(b) shows the surface of a CRT, displaying an integral frame (or frames), bonded to the surface of the small planar face of the device.

FIG. 11(c) shows a liquid crystal display (LCD) bonded to the surface of the small planar face of the device. Illumination of the LCD occurs externally on its non-bonded face.

FIG. 11(d) shows a LCD bonded to the surface of the small planar face of the device. An edge-lit type hologram is bonded to the opposite face of the LCD. The hologram serves as an illumination panel.

FIG. 11(e) shows a plasma display bonded to the surface of the small planar face of the device.

FIG. 11(f) shows a laser flying spot scanner assembly bonded to the surface of the small planar face of the device.

FIG. 11(g) shows a digital light processor (DLP)™ assembly bonded to the surface of the small planar face of the device.

FIG. 11(h) shows some detail of the proprietary DLP™ chip.

FIG. 12(a) illustrates a special video camera with an internal matrix lens array to produce an integral frame.

FIG. 12(b) illustrates a conventional video camera arranged with an external matrix lens array to produce an integral frame.

FIG. 12(c) illustrates a combination of conventional video cameras operating together to produce an integral frame.

FIG. 14(a) is a front elevational view.

FIG. 14(b) is a side elevational view.

FIG. 14(c) is a top plan view.

FIG. 14(d) is a rear elevational view.

DEFINITION OF TERMS USED IN THE PRESENT APPLICATION

Figure 1:
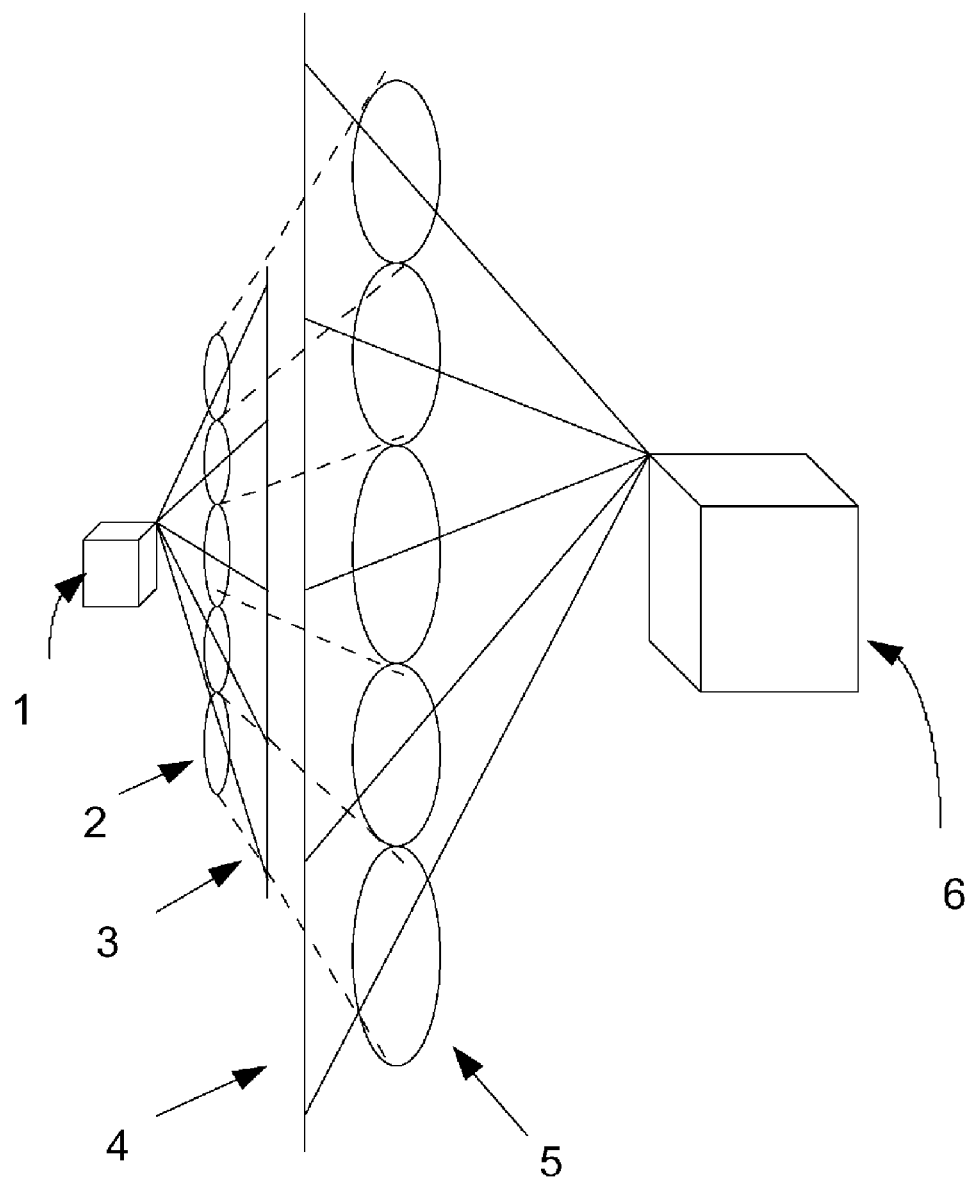
FIG. 1 is an illustration of the Principle of Magnification and Projection.

Within the Present Application, the Applicant intends to use his own definitions of many special terms. Insofar as these special terms are used herein, the definitions provided below supersede the plain and ordinary meanings of the words. The definitions follow:

SCENE—an object or collection of objects positioned in space. A scene is two-dimensional if all object points lie in a single plane that is perpendicular to the line of sight. Otherwise, it is three-dimensional.

ELEMENTAL IMAGE—a single two-dimensional image of a scene as observed from a single viewpoint and which plainly shows that scene.

INTEGRAL FRAME—a two-dimensional arrangement of a coordinated collection of elemental images from a single scene.

INTEGRAL PHOTOGRAPH—a two-dimensional photograph or drawing of an INTEGRAL FRAME.

MATRIX LENS ARRAY—an arrangement of a coordinated collection of imaging elements each capable of producing an in-focus elemental image from electromagnetic radiation (preferably light rays), thereby forming an integral frame.

IMAGING ELEMENT—that part of a matrix lens array which is capable of producing a single in-focus elemental image of an integral frame from electromagnetic radiation (preferably light rays).

SEPARATION DISTANCE—The distance between the centers of two elemental images of an integral frame.

SEPARATION CHARACTERISTIC—an array of separation distances for all of the elemental images of an integral frame or a matrix lens array.

FOCAL CHARACTERISTIC—an array of focal lengths for all of the imaging elements of a matrix lens array.

IMAGE CHARACTERISTIC—a function which when applied to the elemental images of an integral frame yields the focal characteristic of the matrix lens array that produced or would have produced the integral frame.

LOGICAL ALIGNMENT (for two related images)—Two images are LOGICALLY ALIGNED with each other optically if each and every point on one image has a single fixed spatial relationship to a single corresponding point on the other image. They are LOGICALLY ALIGNED with each other electromagnetically if all light (or other electromagnetic) rays from any point on one image will always impinge only on a single corresponding point on the other image. Optical and electromagnetic LOGICAL ALIGNMENT are equivalent since in both there remains a fixed relationship between all points on both images.

TRANSMIGRATOR—a collection of optics or other means to transfer an input image from an input end to an output image at an output end wherein all of the parts of the input image remain logically aligned with all of the corresponding parts of the output image.

MODULAR INTEGRAL MAGNIFIER (the subject of the Present Invention) is a rigid apparatus having a small input end and a large output end and internal enlarging means. A matrix lens array is mounted to the output end or to both ends. The Modular Integral Magnifier either creates or accepts an unmagnified integral frame, and produces a uniformly magnified three-dimensional image of the object or scene.

COMPOSITE INTEGRAL FRAME MAGNIFYING ARRAY is a matrix array of Modular Integral Magnifiers. Each Modular Integral Magnifier magnifies a single component integral frame. The effect produced is a single magnified three-dimensional image of an object or scene.

COMPONENT INTEGRAL FRAMES—integral frames obtained from separating a single input integral frame to form a plurality of integral frames all representing the same three-dimensional scene.

EVERSION or EVERTING (or TO EVERT)—a process that transforms a pseudoscopic three-dimensional image into an orthoscopic three-dimensional image.

UNIFORM MAGNIFICATION—(for a three-dimensional image) is essentially equal magnification in all spatial dimensions.

UNIFORM ENLARGEMENT—(for a two-dimensional image) is essentially equal magnification in all planar (or surface) dimensions.

MAGNIFICATION FACTOR—the ratio of essential dimensions of that which is magnified or enlarged to those of that which is unmagnified or not enlarged.

GEOMETRICALLY SIMILAR IN ARRANGEMENT—two arrays of imaging elements or of elemental images are similar if the ratio of separation characteristics of both arrays is a constant.

PROJECTING (PROJECTION)—causing electromagnetic radiation (or light rays) to travel from one location to another.

ANALOG PROJECTION—simultaneous projection of all of the radiation (or rays) of an image from one location to another.

DIGITAL PROJECTION—projection of radiation (or rays) from a discrete location of an image to another discrete location.

PROJECTION BY SCANNING—forming an image on a surface whereby a discrete light or electromagnetic beam controllably travels to various points on the surface while varying in intensity.

PROJECTION IS ACCOMPLISHED OPTICALLY—projection wherein light rays travel through optical elements from one location to another.

PROJECTION IS ACCOMPLISHED ELECTROMAGNETICALLY—projection wherein electromagnetic radiation (other than light) is transmitted from one location to another using electronic devices.

DIGITAL LIGHT PROCESSOR CHIP—comprises a Digital Micromirror Device, or DMD chip (invented by Dr. Larry Hornbeck of Texas Instruments in 1987), that further comprises a rectangular array of up to 1.3 million hinge-mounted microscopic mirrors. The micromirrors are mounted on tiny hinges that enable them to tilt either toward a light source (ON) or away from it (OFF) thereby creating a light or dark pixel on a projection surface. Texas Instruments currently markets a DIGITAL LIGHT PROCESSOR CHIP under the trade name DLP™.

DETAILED DESCRIPTION OF THE PREFERRED AND ALTERNATE EMBODIMENTS

The Principle of Magnification and Projection was described in the Claimed Priority Patents and Applications. The principle is illustrated in FIG. 1. Integral frame 3 is formed on a single plane using light (or other electromagnetic radiation) from a three-dimensional object or scene 1 using matrix lens array 2. Integral frame 3 is then magnified by a magnification factor using conventional means to produce integral frame 4. Integral frame 4 is comprised of elemental images in the same number and geometrically similar arrangement as integral frame 3. Matrix lens array 5 has the same number and geometrically similar arrangement of elements as matrix lens array 2, but the distances between the centers of all the elements as well as the focal lengths of all the elements of matrix lens array 5 are multiplied by the same magnification factor. The ratio of each element of the Focal Characteristic to the corresponding element of the Separation Characteristic of matrix lens array 5 is equal respectively to the same ratio for matrix lens array 2 over its entire extent. Therefore, matrix lens array 5 is scaled up from matrix lens array 2 by the given magnification factor. When the integral frame 4 is correctly positioned and aligned with matrix lens array 5, object or scene 6 is reconstructed in space as object or scene 1 magnified by the given magnification factor. If scene 1 is two-dimensional, then scene 6 will be uniformly enlarged in two-dimensions by the given magnification factor. If scene 1 is three-dimensional, scene 6 will also be three-dimensional and will be uniformly magnified by the given magnification factor in all three dimensions.

Figure 2:
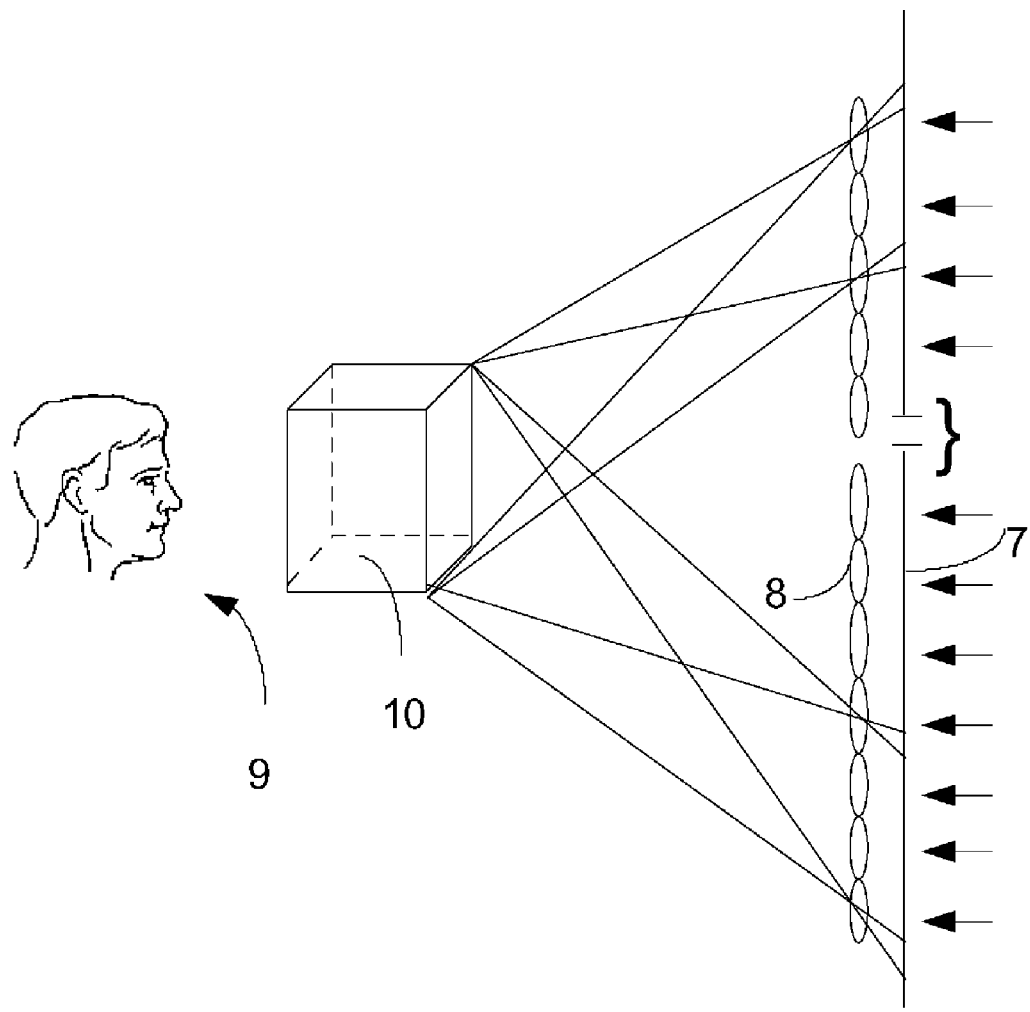
FIG. 2 is an illustration showing how an observer sees a three-dimensional object or scene reconstructed by rear projection of an integral frame through a matrix lens array.

FIG. 2 shows an observer 9 viewing a three-dimensional reconstruction 10 of a three-dimensional object or scene produced by rear projection. Integral frame 7 is illuminated by light rays that pass through it into matrix lens array 8. Integral frame 7 comprises elemental images of the three-dimensional object or scene. In reconstructing the three-dimensional image 10 of that object or scene, light rays passing through the representation of each point created from the object or scene in each elemental image all converge to the same point on real image 10. It should be noted that observer 9 will see image 10 as a pseudoscopic image, i.e., points that should appear further away from him will appear to be closer to him than points that should appear further away. In other words, the three-dimensional image 10 will appear to be turned inside-out. This can be confusing. However, the Claimed Priority Patents and Applications discuss methods of producing a reconstructed everted image that is orthoscopic, i.e., an image that will appear to be correct when viewed in three-dimensions. The relevance of conversion from pseudoscopy to orthoscopy to the present invention will be discussed later.

From the discussion of the Claimed Priority Patents and Applications in the Background Section of the Present Application, it can be seen that extremely high accuracy and precision is required for positioning and aligning the optical elements for reconstruction. In addition, once situated, the optical elements must retain a high degree of positional stability relative to each other. Small changes in the relative positions of the optical elements will create unacceptably large movement of the reconstructed image. These small changes in optical alignment may be due to, inter alia, vibration, strain, or dimensional changes caused by variations in temperature. Care must be taken to insure that the input and output images are logically aligned at all times. The present invention solves this problem by stabilizing the relative positioning of the optical elements.

Figure 3:
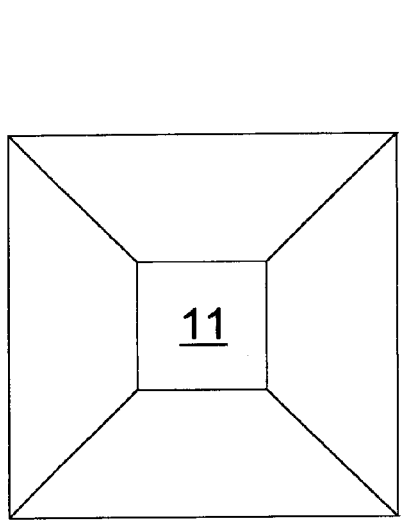
FIG. 3 is an illustration of two views of the first embodiment of the Present Invention.
Figure 3:
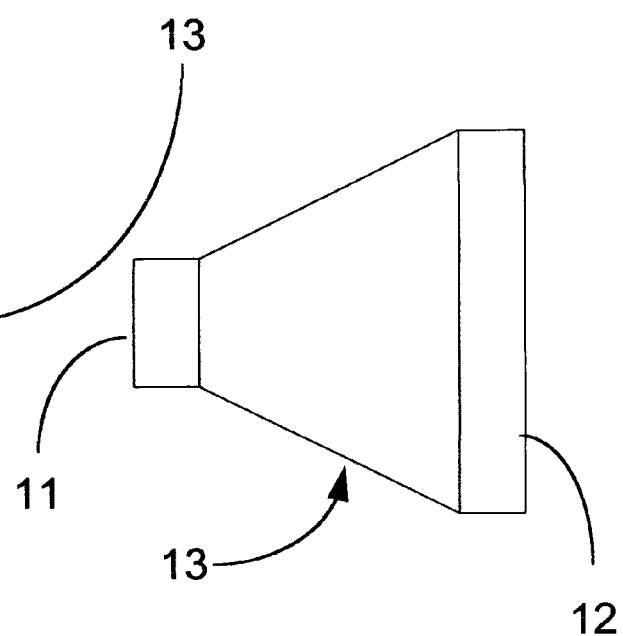

FIG. 3 is an illustration of two views of the first embodiment of the Present Invention. This embodiment is intended to be used primarily for magnifying live real-time three-dimensional objects or scenes. It may also be used to magnify the three-dimensional reconstruction from a hologram. FIG. 3(a) shows a rear elevational view while FIG. 3(b) shows a side elevational view. The invention comprises three sections, viz., a transmigrator 13 and two matrix lens arrays 11 and 12. Transmigrator 13 is shaped as a frustum of a pyramid. It has six faces. Two of its faces are rectangular in shape and positioned opposite to one another. They are preferably of different size but similar in shape. Therefore, in the preferred sub-embodiment of the first embodiment, there will be a large rectangular face and a small rectangular face. The other four faces are trapezoidal in shape and preferably planar although some deviations from a plane are possible. The matrix lens arrays 11 and 12 are bonded to the two rectangular faces so as to cover the faces and to be immobile. In the figure, array 11 is bonded to the small rectangular face and array 12 is bonded to the large rectangular face. Matrix lens arrays 11 and 12 are similar to each other in shape, and the have the same number of elements in the same arrangement. The ratio of the separation characteristics of arrays 12 to 11 is equal to the anticipated magnification factor. The arrangement of the elements and focal lengths of array 12 relative to array 11 is governed by the above discussion of FIG. 1, and the ratio of the focal characteristics of matrix lens arrays 11 to 12 is equal to the anticipated magnification factor. Inside of transmigrator 13 is a means (not shown in the figure) for enlarging the initial integral frame produced by array 11 for presentation to array 12 such that the initial and enlarged integral frames are logically aligned so as to enable reconstruction.

In another configuration, the transmigrator can be a frustum of a cone comprising three surfaces—a small and large circular face (or elliptical face) positioned opposite to each other and a conical surface. Circular (or elliptically shaped) matrix lens arrays are bonded to the respective circular faces (or elliptical faces). In yet another configuration, the opposite faces to which the matrix lens arrays are bonded may be similarly shaped regular polygons.

Figure 4:
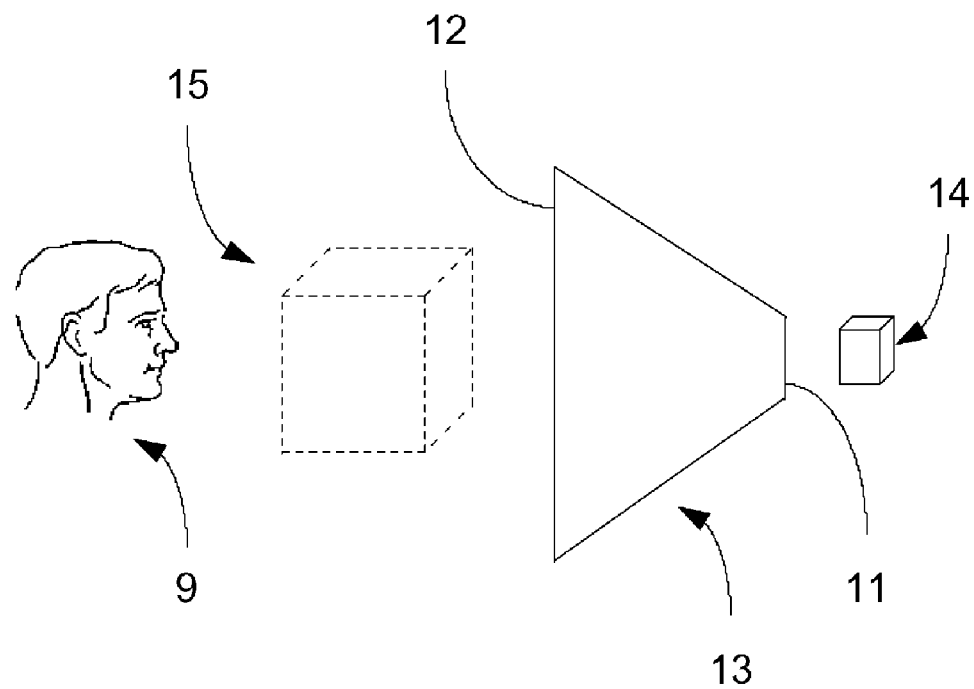
FIG. 4 shows how an observer would view a magnified three-dimensional image produced by the first embodiment of the Present Invention.

FIG. 4 shows how the first embodiment of the Present Invention would be used to display a magnified image. In the figure, observer 9 sees magnified image 15 reconstructed from unmagnified object or scene 14. Observer 9 is closer to and looking at matrix lens array 12. Unmagnified object or scene 14 is positioned closer to matrix lens array 11. Magnifying or enlarging optics are contained within transmigrator 13 and are not shown in the figure.

The separation characteristic is either a vector or a two dimensional matrix. There are as many elements in each dimension of the matrix as there are elemental images in the integral frame. If the integral frame is uni-dimensional (i.e., comprised of a linear array of elemental images), then the matrix is a vector, and the number and arrangement of elements of the vector is the same as the number and arrangement of elemental images in the integral frame. The value of the leftmost element of that vector is twice the distance from the leftmost edge of the leftmost elemental image to its center. If the integral frame is two-dimensional, then the matrix is three-dimensional, having two planes, each plane having the same number of elements as there are elemental images in the integral frame. The elements in each plane have the same arrangement as the corresponding elemental images in the integral frame. One plane (the X-Plane) represents the separation distances in the x-axis direction and the other plane (the Y-Plane) represents the separation distances in the y-axis direction. The value of the leftmost element of each row of the X-Plane is twice the distance from the leftmost edge of the leftmost elemental image of the corresponding row to its center. The value of the topmost element of each column of the Y-Plane is twice the distance from the topmost edge of the topmost elemental image of the corresponding column to its center. The separation characteristic can also represent the distances between the centers of the imaging elements in a matrix lens array.

Figure 5:
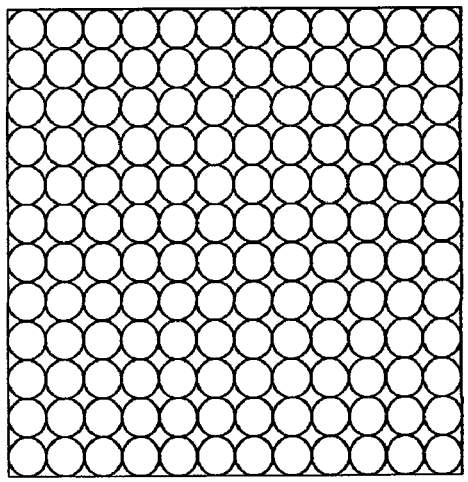
FIG. 5 shows six possible configurations for the elements in a matrix lens array.
Figure 5:
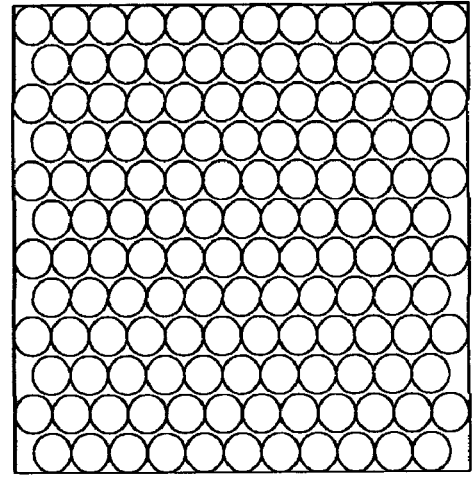
Figure 5:
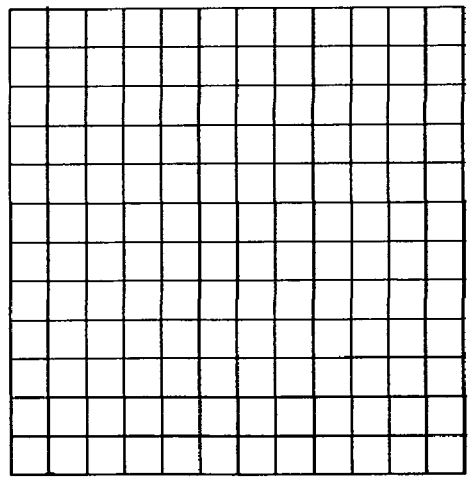
Figure 5:
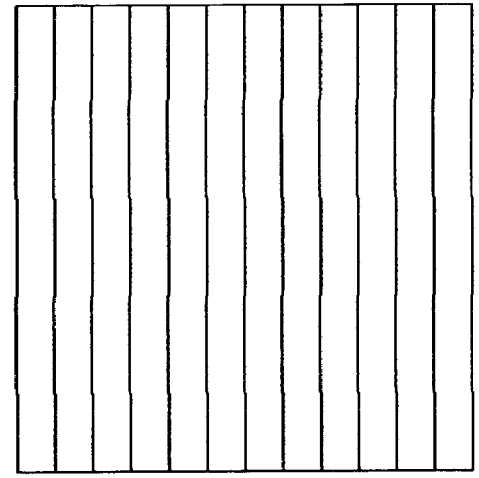
Figure 5:
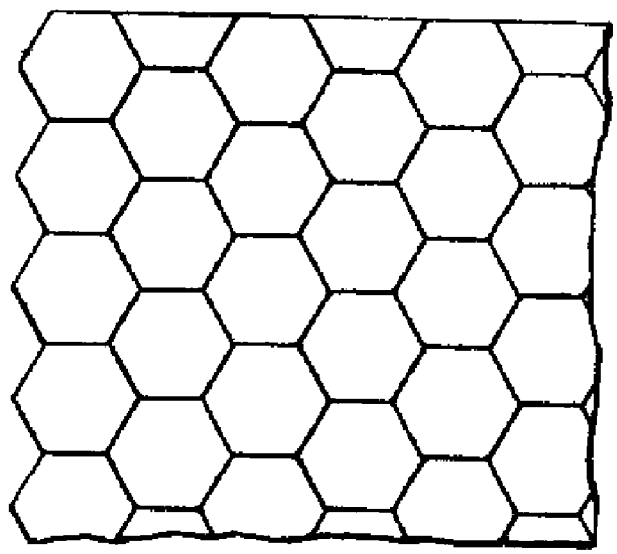
Figure 5:
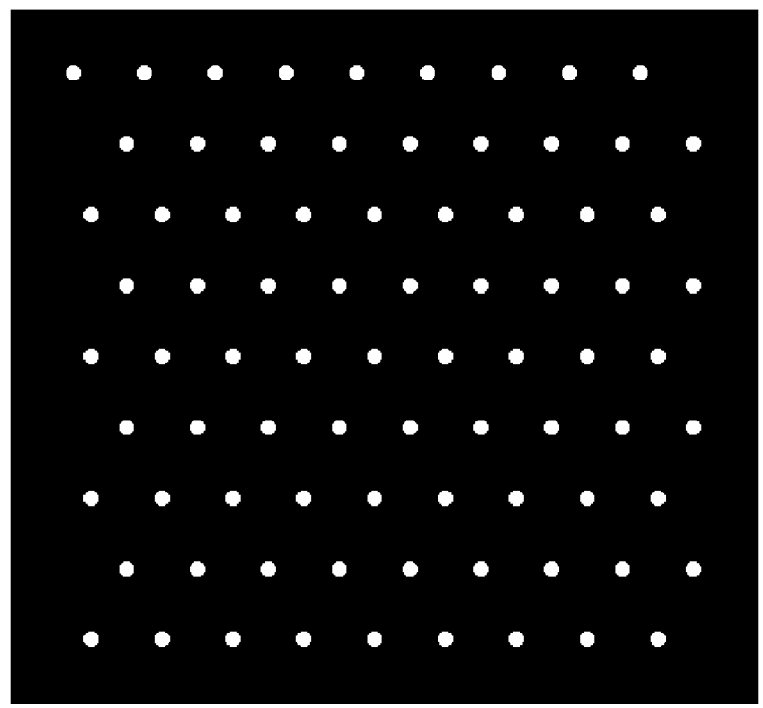

The shapes and relative positions of the imaging elements in a matrix lens array may vary and is selectable. Imaging may be accomplished by different means. For example, the matrix lens array may be an array of imaging small lenses (or lenslets), or it may even be an array of pinholes on an opaque substrate. The imaging elements may be refractive, reflective, or diffractive. Lenses or imaging elements may touch on their edges, or they may be separated. FIG. 5 illustrates six possible configurations of a matrix lens array. However, this figure and accompanying discussion is not meant to limit the choices. FIG. 5(*a*) shows spherical elements positioned in a square matrix. They may be completely or partially spherical. For example, they may be spheres that are attached to each other at a single point; they may be semi-spheres; or they may be cylinders with at least one spherical surface. They may also be circular Fresnel Zone Plates or Gabor Zone Plates capable of producing spherical wavefronts (as described in the Claimed Priority Patents and Applications). FIG. 5(*b*) shows spherical elements that are hexagonally close packed. FIG. 5(*c*) shows rectangular elements positioned in a rectangular matrix. These may be fabricated, for example, as rectangular elements with spherical surfaces or as crossed cylindrical elements. FIG. 5(*d*) shows linearly adjacent cylindrical elements. This would be a lenticular material or Bonnet screen, and would be used where it is acceptable to show three-dimensional parallax only in a single dimension (i.e., the elimination of vertical parallax). The cylindrical elements could also be linear Fresnel Zone Plates or linear Gabor Zone Plates capable of producing cylindrical wavefronts (as described in the Claimed Priority Patents and Applications). FIG. 5(*e*) shows hexagonally shaped spherical elements that are hexagonally close packed. FIG. 5(*f*) shows a hexagonally close packed array of pinholes on a dark substrate. The pinholes can have any desired configuration.

Figure 6:
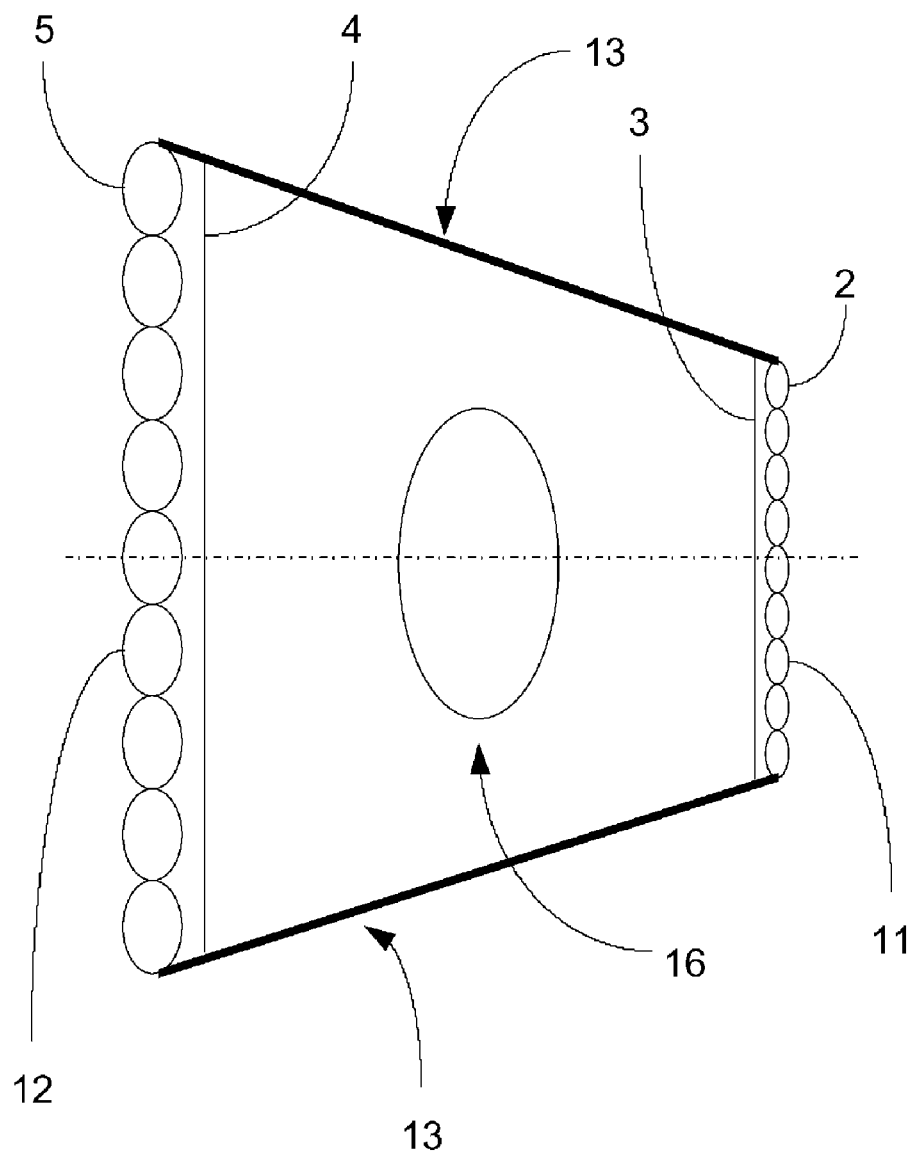
FIG. 6 is an illustration of the internal configuration of the first embodiment of the Present Invention.

FIG. 6 is a schematic illustration of the internal configuration of the first embodiment of the Present Invention. Matrix lens arrays 11 and 12 are bonded to opposite faces 3 and 4 of transmigrator 13. Magnifying optics 16 enlarge the integral frame incident on surface 3 by conventional means to produce a logically aligned enlarged integral frame on surface 4. Enlarging optics 16 may be simple or complex, and are known in the art. As will be discussed later, matrix lens arrays 11 and 12 may also be simple or complex. Matrix lens array 12 comprises a plurality of elements 5 of the same number and arrangement as elements 2 of matrix lens array 11. It is required that the entire assembly of FIG. 6 have all of its components aligned and positioned with respect to one another to insure that the initial and enlarged integral frames are logically aligned. The simplest manifestation of this would be where the entire assembly is a solid block. Transmigrator 13 would be constructed of an optically transparent and dimensionally stable material. Examples of such a material would be glass, a crystalline substance such as quartz or diamond, or some transparent plastic. In the preferred embodiment, the exterior surfaces of transmigrator 13 not in contact with the matrix lens arrays are dark and opaque. If magnifying optics 16, internal to transmigrator 13, is refractive in nature, it would necessarily be constructed of a different material of different refractive index than that used for constructing transmigrator 13. It can even be a cavity filled with air or partially or totally evacuated. The shapes of the optical elements comprising the enlarging optics 16 would be determined by the construction materials of 16 relative to the entire assembly as well as the image characteristics of the initial and enlarged integral frames. However, enlarging optics 16 may also be reflective in nature comprising mirrored surfaces. Alternatively, coherent fiber optics bundles may be used to create the enlarged integral frame from the initial integral frame. The fiber optics bundles may be either rigid or flexible. However, logical alignment between the input and output images of the bundle must be maintained. In any event, the entire assembly of FIG. 6 could be handled easily without disturbing the relative positions of its components or the logical alignment of its images. The optics for either or both of the matrix lens arrays or the enlarging optics or all of the optics in the device may be holographic or may contain holographic optical elements.

Figure 7:
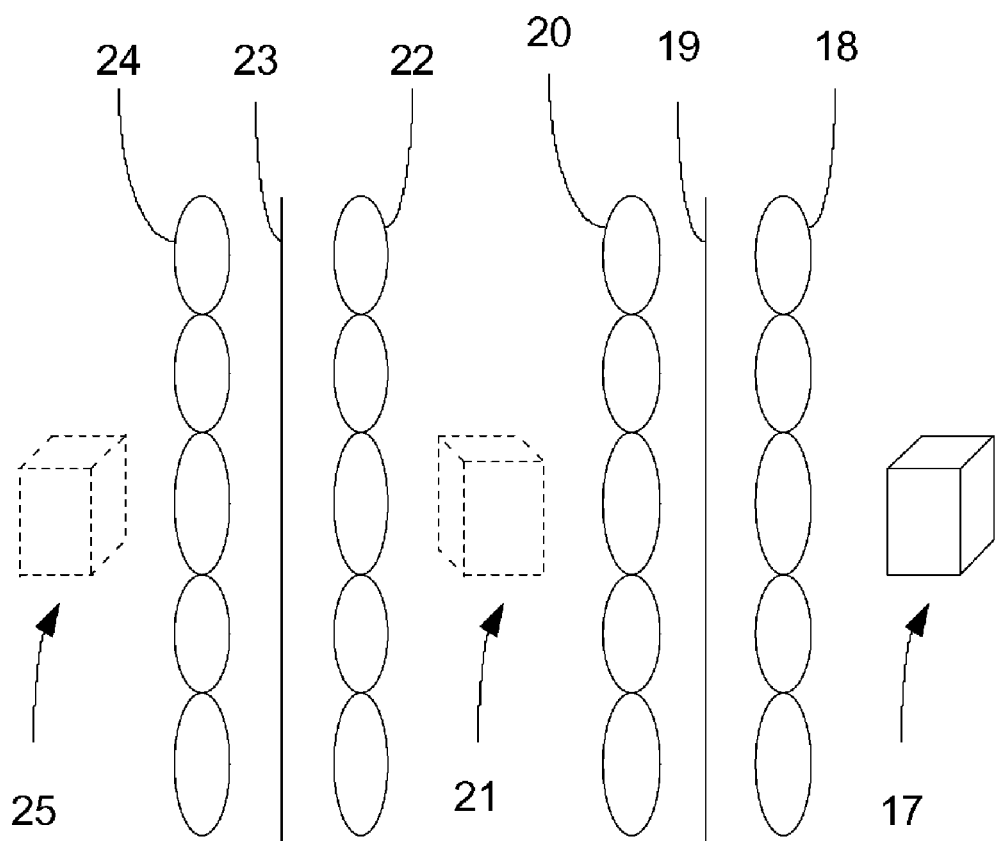
FIG. 7 shows one possible method for producing a reconstructed orthoscopic image of an object or scene from a reconstructed pseudoscopic image of that object or scene.

As mentioned earlier, observer 9 in FIG. 4 would observe magnified reconstruction 15 as a pseudoscopic image of unmagnified three-dimensional object or scene 14. This is undesirable. FIG. 7 shows one possible method for eversion or producing a reconstructed orthoscopic image of an object or scene from a reconstructed pseudoscopic image of that object or scene. In FIG. 7, integral frame 19 is created by the light rays of object or scene 17 passing through matrix lens array 18 and impinging upon the plane of that integral frame. The same light rays then pass through matrix lens array 20 and reconstruct a pseudoscopic image 21 of object or scene 17. The same light rays then pass through matrix lens array 22 and produce integral frame 23. The same light rays then pass through matrix lens array 24 and reconstruct image 25 as a pseudoscopic image of image 21. However, since reconstructed image 21 is a pseudoscopic image of object or scene 17, reconstructed image 25, therefore, will be an image that is an orthoscopic reconstruction of object or scene 17. Therefore, the optical combination serves to evert the final three-dimensional reconstruction so as to be orthoscopic. The apparatus of FIG. 7 comprises four identical matrix lens arrays and two integral frames. One may use diffusing plates in the planes of either or both integral frames. Preferably, this apparatus will produce unmagnified images.

If matrix lens array 12 of the embodiment shown in FIG. 3 were a complex system comprised of components similar to matrix lens arrays 20, 22, and 24 along with integral frame 23 of FIG. 7, then the device shown in FIG. 4 would produce an orthoscopic image 15 from object or scene 14 to be observed by observer 9. Similarly, if the matrix lens array 11 of the embodiment shown in FIG. 3 were a complex system comprised of components similar to matrix lens arrays 18, 20, and 22 along with integral frame 19 of FIG. 7, then the device shown in FIG. 4 would produce the same orthoscopic image 15 from object or scene 14.

Figure 8:
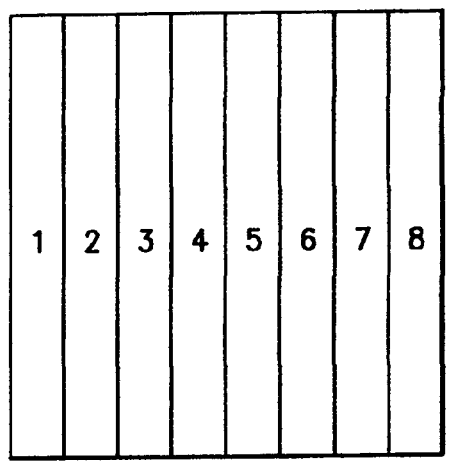
FIG. 8 shows one possible method for manipulating the elemental images of an integral frame so that the reconstructed image would be orthoscopic instead of pseudoscopic.
Figure 8:
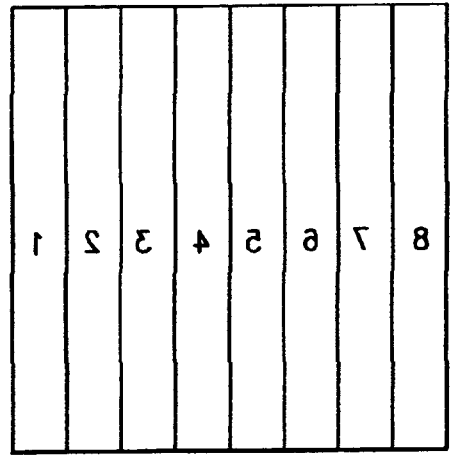
Figure 8:
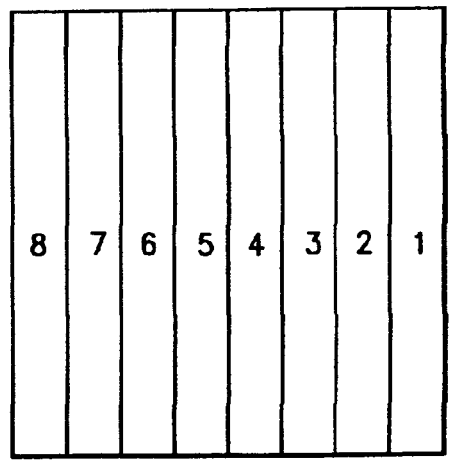

FIG. 8 shows a possible method for manipulating the elemental images of an integral frame so that the reconstructed image would be orthoscopic instead of pseudoscopic. This method was described in the Claimed Priority Patents and Applications. FIG. 8(*a*) shows an original integral frame comprised of eight elemental images. Each of the elemental images, 1–8, represents a separate view of a three-dimensional scene from a different viewpoint along a horizontal axis. The integral frame shown in FIG. 8(*a*) will reconstruct a pseudoscopic three-dimensional image of the scene with horizontal parallax only. However, the integral frame of FIG. 8(*c*) is needed in order to reconstruct an orthoscopic three-dimensional image of the scene with the same parallax. The integral frame in FIG. 8(*c*) differs from that of FIG. 8(*a*) in that the order of the elemental images is left-right reversed. However, the elemental images themselves are not left-right reversed. FIG. 8(*b*) shows an integral frame that may be used as an intermediate to produce the integral frame of FIG. 8(*c*) from that of FIG. 8(*a*). To produce the integral frame of FIG. 8(*b*) from that of FIG. 8(*a*), the elemental images themselves are left-right reversed, but the order of elemental images in both integral frames remains the same. The left-most elemental image in FIG. 8(*a*) remains as the left-most elemental image in FIG. 8(*b*); and the right-most elemental image in FIG. 8(*a*) remains as the right-most elemental image in FIG. 8(*b*). Then, to produce the integral frame of FIG. 8(*c*), one need merely left-right reverse the entire integral frame of FIG. 8(*b*). This is a simpler process than direct production of the integral frame of FIG. 8(*c*) from that of FIG. 8(*a*). Once one understands this principle for production of orthoscopic images, the optics to produce the integral frame of FIG. 8(*c*) would be known to one of ordinary skill. Therefore, in FIG. 6, utilizing the optical methodologies discussed in the current paragraph and the previous paragraphs, one may substitute optics for elements 11, 12, and 16 that would produce orthoscopic instead of pseudoscopic reconstructed images.

The matrix lens arrays 11 and 12 in the figures may further comprise color plates for the purpose of producing color reconstructions from integral frames comprising monochromatic elemental images. Another function of the color plates is to eliminate chromatic aberration of images produced from zone plate matrix lens arrays. The use of color plates for these purposes is described in the Claimed Priority Patents and Applications. One embodiment of such a matrix lens array uses a color plate with sections corresponding to the two-dimensional shape of the elements of the matrix lens array with the same separation characteristic and which filters a different color for light impinging upon or emerging from each element of the array. An example of this is where the colored sections alternate between the colors red, green, and blue.

Figure 9:
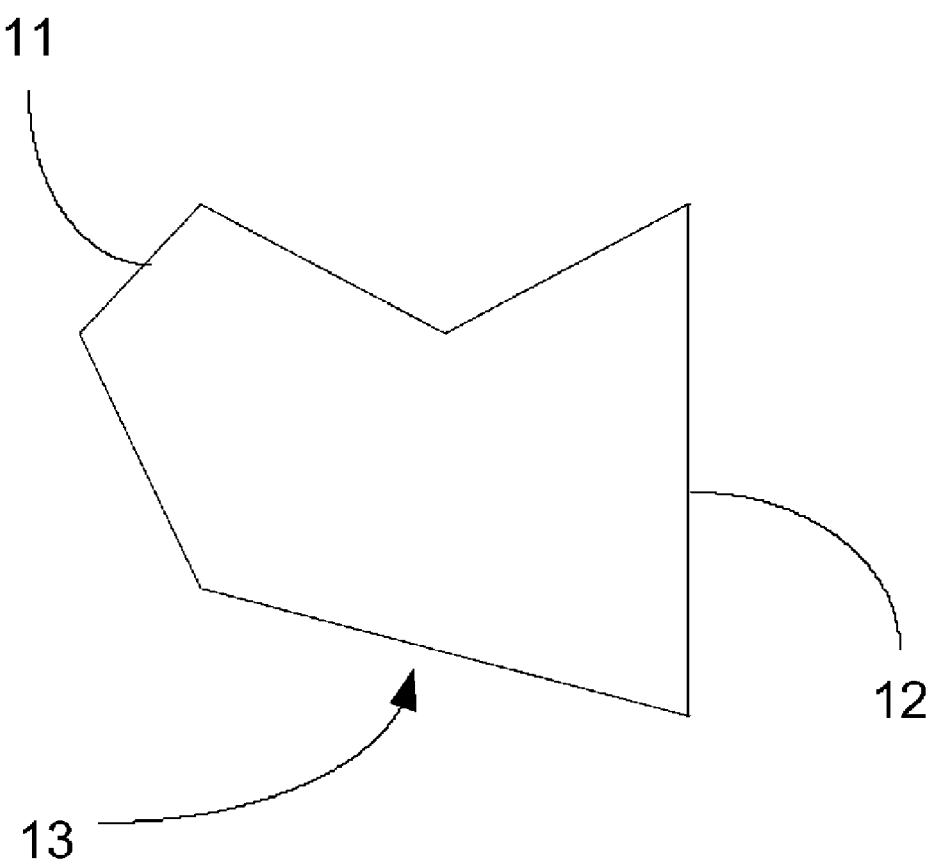
FIG. 9 is an illustration of an embodiment of the Present Invention where the optical path is bent.

FIG. 9 illustrates that the optical path between input matrix lens array 11 and output matrix lens array 12 is not a single straight line. Instead the light rays traveling from array 11 to array 12 are bent. One way of accomplishing this is with the use of coherent fiber optic bundles. Another way of accomplishing this is with the use of reflective optics.

Finally, this first embodiment of the Present Invention may be used for demagnification. Its normal intended use for magnification requires that the object or scene be positioned near or facing the small matrix lens array 11 in the figures. In that case, the uniformly magnified image is reconstructed using large matrix lens array 12. The observer is positioned near or facing array 12. However, should the object or scene be positioned or facing the large matrix lens array 12, a uniformly demagnified image may be reconstructed using small matrix lens array 11. In that case, the observer would be positioned near or facing array 11.

Figure 10:
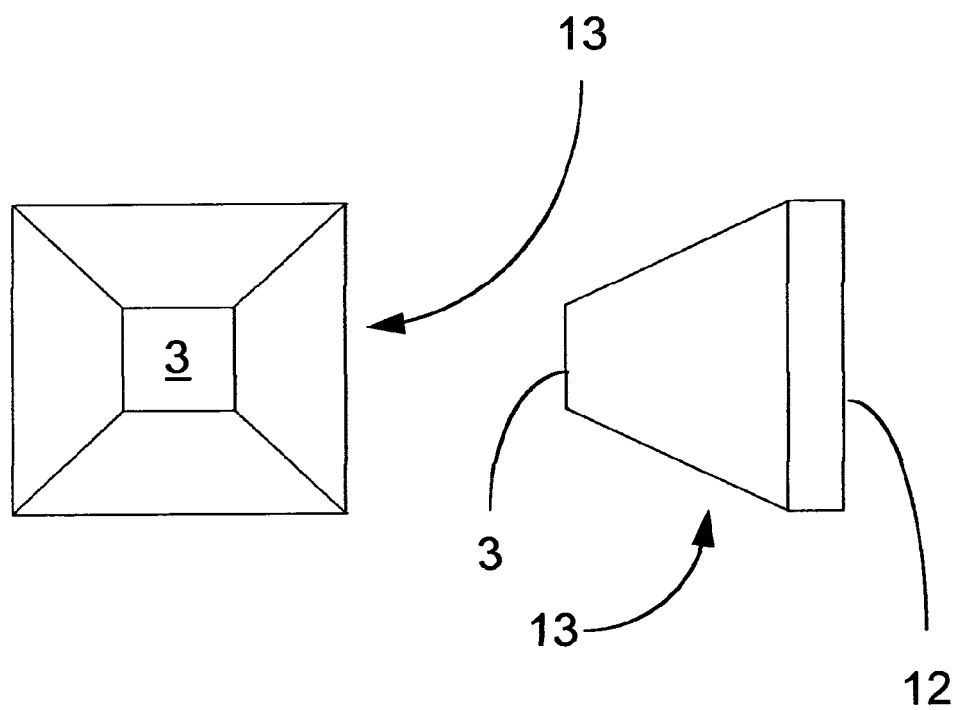
FIG. 10 is an illustration of two views of the second embodiment of the Present Invention.
Figure 11:
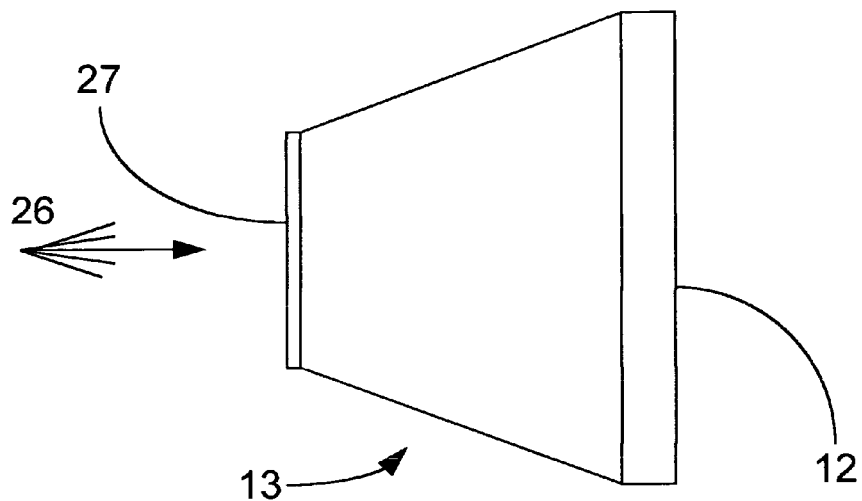
FIG. 11 shows examples of the use of different types of already prepared integral frames with the second embodiment of the Present Invention.
Figure 11:
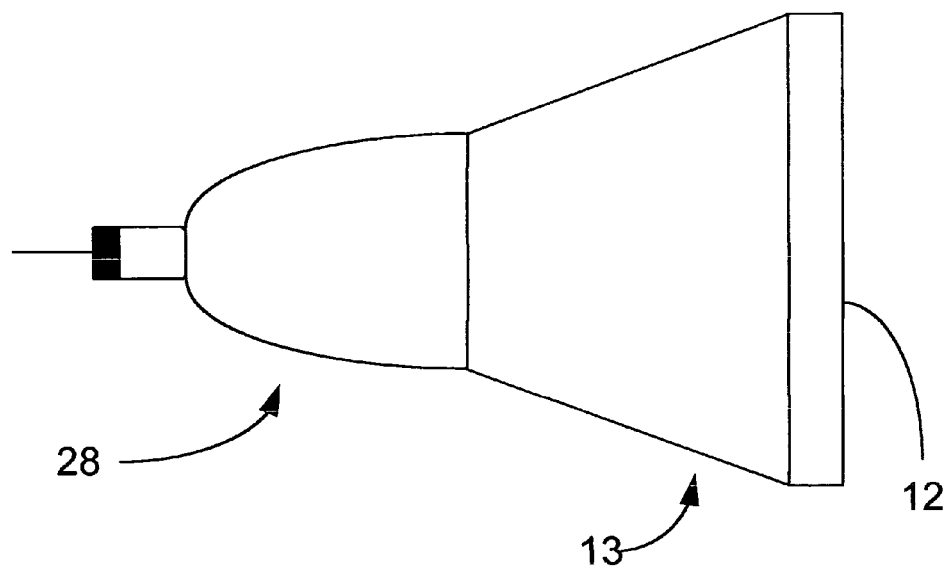
Figure 11:
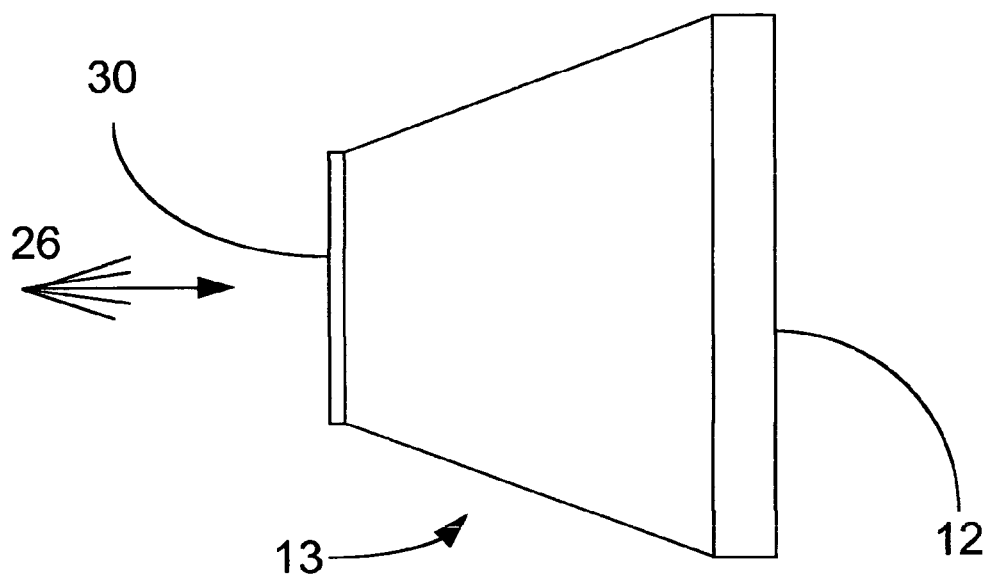
Figure 11:
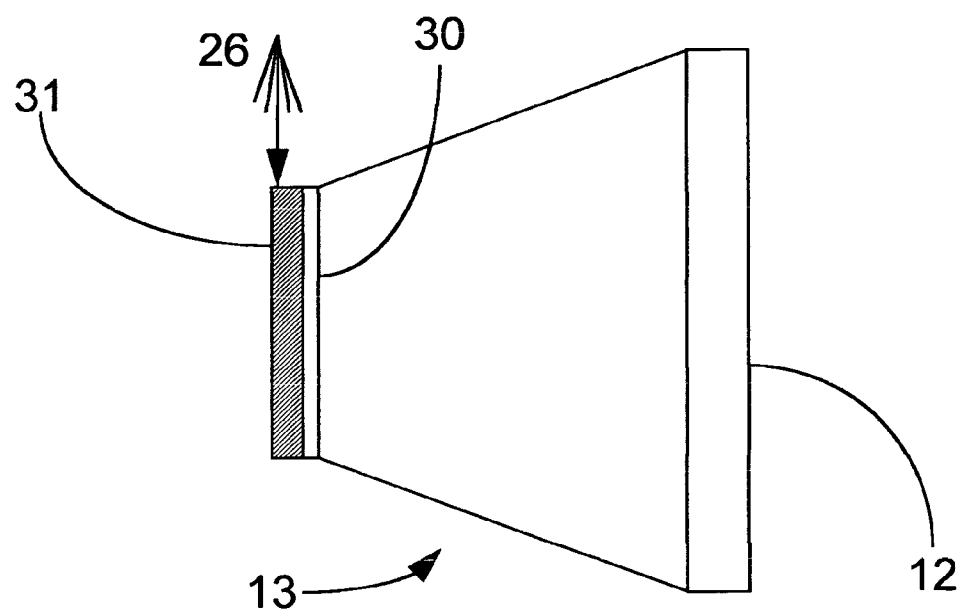
Figure 11:
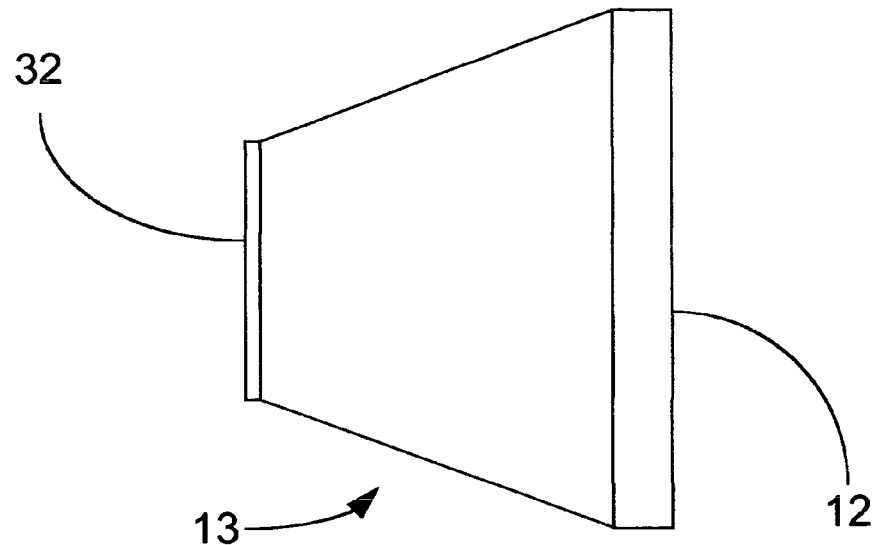
Figure 11:
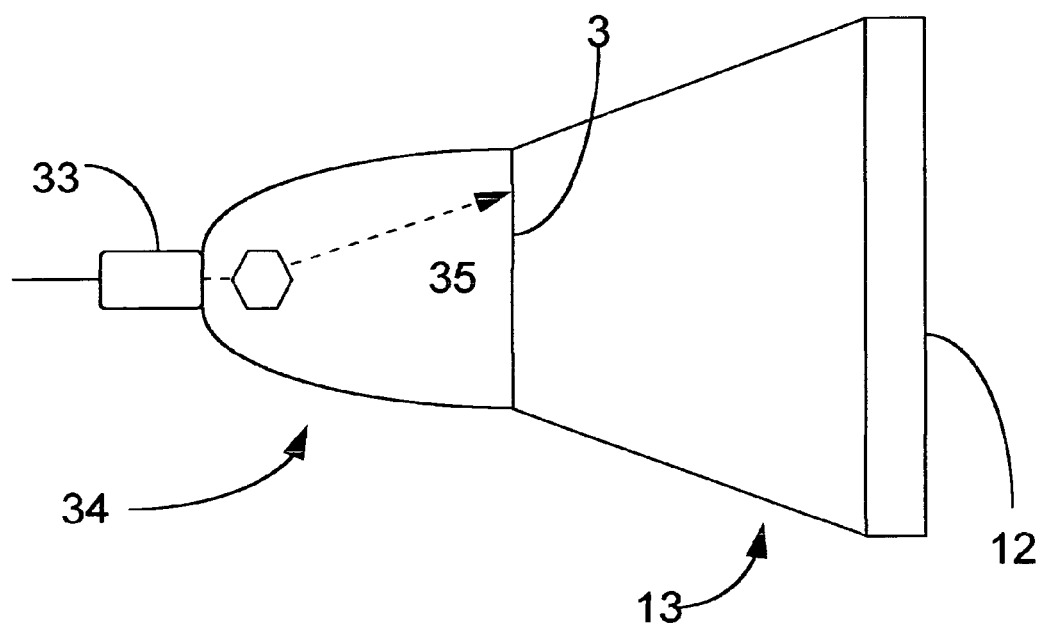
Figure 11:
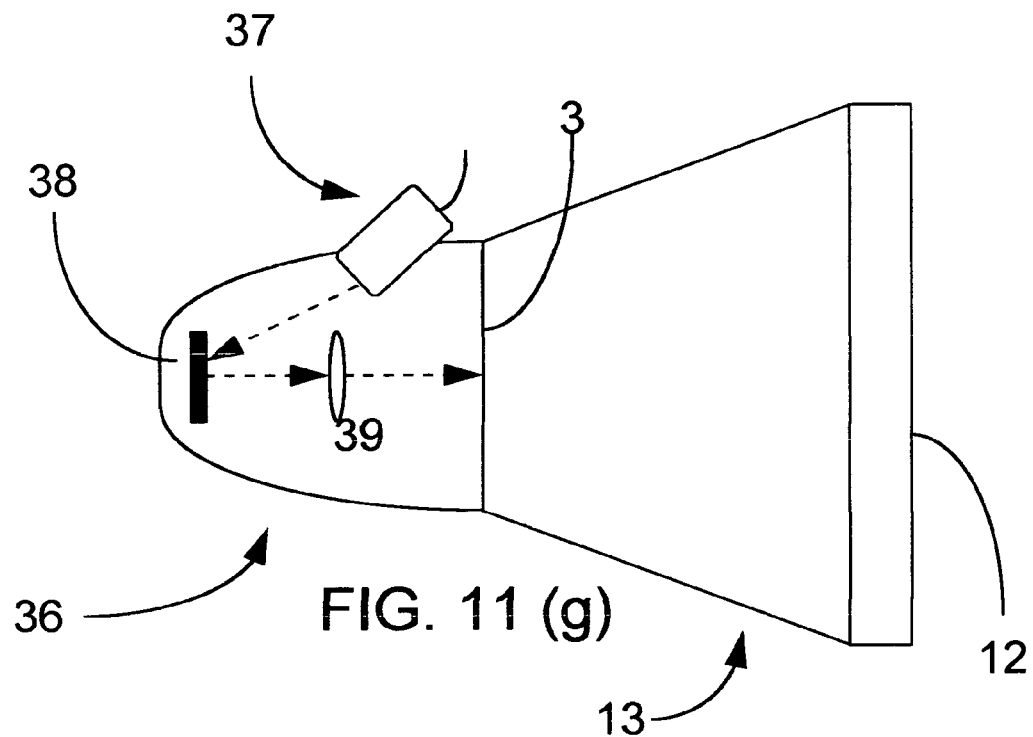
Figure 11:
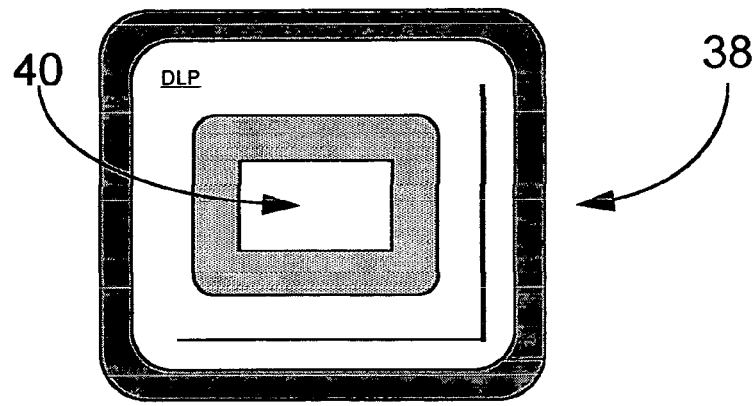

FIG. 10 is an illustration of two views of the second embodiment of the Present Invention. This embodiment is intended to be used primarily for magnifying images from already prepared integral frames. One example of such an already prepared integral frame is an integral photograph. The only difference between this second embodiment and the first embodiment shown in FIG. 3 is the absence of matrix lens array 11 that had been bonded to small face 3 of transmigrator 13. Instead the integral frame is introduced directly onto the planar surface of face 3. There are many methods by which the already prepared integral frame may be produced on small face 3. One such method is optical projection of the integral frame onto face 3. This would work, but alignment and positional stability would be difficult to maintain since the projector is a device that would be separated from the Present Invention. Transferring an image of the integral frame using a coherent fiber optics bundle would also work, especially if one face of the fiber optics bundle is bonded to the small face of the Present Invention. However, alignment between the input integral frame and the non-bonded face of the fiber optics bundle would need to be maintained in tight tolerance. FIG. 11(*a*) shows a very workable system where integral photograph transparency 27 is bonded to small face 3 (not shown in the figure) of transmigrator 13. Light rays 26 would pass through integral photograph 27 and transmigrator 13 whereupon a magnified image of integral photograph 27 would be processed by matrix lens array 12 which would reconstruct a magnified three-dimensional image of the scene represented by integral photograph 27.

Of course, an initial integral frame may be pre-everted prior to introduction to the device. In this way, everting optics would not be required in the device. The device would be able to produce output three-dimensional orthoscopic images without eversion. The initial integral frame may be pre-everted optically or by computer. If it is a cartoon, the elemental images may be drawn so as to be pre-everted.

An exemplary instance of the second embodiment of the Present Invention is shown in FIG. 11(b). In the figure, the output planar face of a CRT 28 displaying an integral frame (or frames) is bonded to small face 3 (not shown in the figure) of transmigrator 13. The image of the integral frame from the CRT is magnified within transmigrator 13 and processed by matrix lens array 12 to produce a reconstructed three-dimensional image represented by the integral frame.

FIG. 11(c) shows one face of a liquid crystal display (LCD), 30, bonded to the surface of the small planar face of the device. Illumination of the LCD occurs externally on its non-bonded face by light rays 26. LCD 30 modulates the light rays by means known to those of ordinary skill, and produces a display of an integral frame. The integral frame is magnified within transmigrator 13 and processed by matrix lens array 12 to produce a reconstructed three-dimensional image represented by the integral frame.

FIG. 11(d) shows one face of LCD 30 bonded to the small planar face of the device. An edge-lit type hologram 31 is bonded to the other face of LCD 30. Hologram 31 is either a waveguide hologram as described in U.S. Pat. No. 5,515,184 and U.S. Pat. No. 5,854,697 (issued to John H. Caulfield, et.al., on May 7, 1996 and on Dec. 29, 1998, respectively); or a grazing incidence hologram as described in U.S. Pat. No. 5,710,645, U.S. Pat. No. 5,822,089, and U.S. Pat. No. 6,151,142 (issued to Nicholas J. Phillips, et.al., on Jan. 20, 1998, on Oct. 13, 1998, and on Nov. 16, 1999, respectively). Such a hologram will be used in a manner described in U.S. patent application Publication No. U.S. 2002/0001110 A1 (by Michael H. Metz, et.al., published on Jan. 3, 2002). When illuminated by light rays 26 on its edge, hologram 31 acts as an illumination panel providing uniform illumination to LCD 30. LCD 30 modulates the light rays by means known to those of ordinary skill, and produces a display of an integral frame. The integral frame is magnified within transmigrator 13 and processed by matrix lens array 12 to produce a reconstructed three-dimensional image represented by the integral frame.

FIG. 11(e) shows a conventional flat plasma display tube that displays an integral frame bonded to the surface of the small planar face 3 (not shown in the figure) of transmigrator 13. The image of the integral frame from the plasma display tube is magnified within transmigrator 13 and processed by matrix lens array 12 to produce a reconstructed three-dimensional image represented by the integral frame.

FIG. 11(f) shows a laser flying spot scanner assembly bonded to the surface of the small planar face 3 of transmigrator 13. Coherent light 35 from laser 33 impinges upon face 3 as a point of light and is scanned in two-dimensions across the entire face 3 at high speed (approximately 30 fps). Light 35 is digitally modulated with data necessary to produce a pixelated image of an integral frame on face 3. This image is magnified within transmigrator 13 and processed by matrix lens array 12 to produce a reconstructed three-dimensional image represented by the integral frame.

FIG. 11(g) shows a Digital Light Processor (DLP™) assembly 36 bonded to the surface of the small planar face 3 of transmigrator 13. DLP™ chips are manufactured and sold by Texas Instruments. A DLP™ chip is capable of projecting a high-resolution digital image (1.3-million pixels). DLP™ chips are used in high quality digital projectors. In FIG. 11(g), light source 37, imbedded within assembly 36, illuminates DLP™ chip 38 which reflects an image of an integral frame through projection lens 39 as an integral frame on the surface of face 3. This image is magnified within transmigrator 13 and processed by matrix lens array 12 to produce a reconstructed three-dimensional image represented by the integral frame. FIG. 11(h) shows a more detailed construction of DLP™ chip 38. Central area 40 contains 1.3-million micro-mirrors that pivot at high speed. Each mirror represents a pixel. When an individual micro-mirror pivots so that its face is illuminated by light source 37, that pixel lights up. When the micro-mirror pivots so that it faces away from light source 37, that pixel remains dark.

Figure 12:
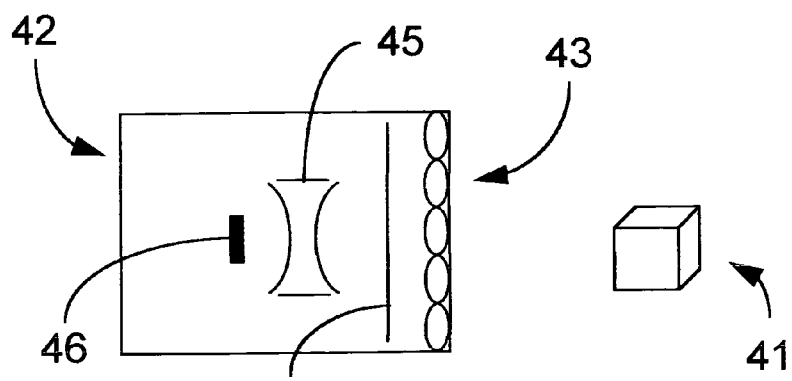
FIG. 12 is an illustration of three different embodiments of specialized video cameras that work in conjunction with a specialized CRT to accomplish magnification of an integral frame.
Figure 12:
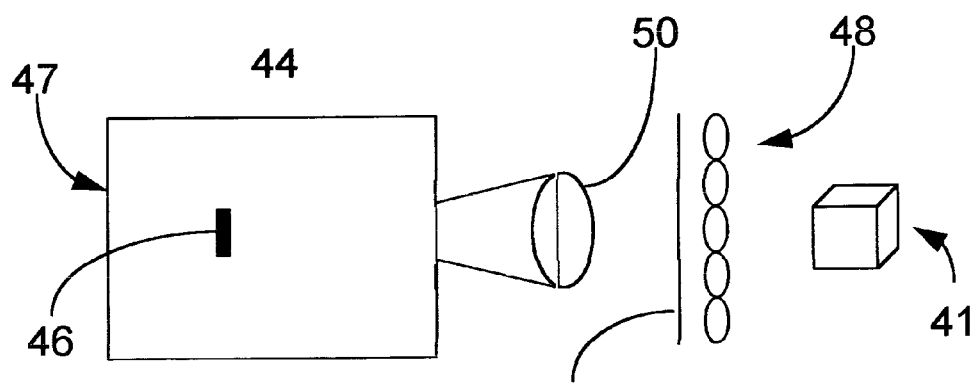
Figure 12:
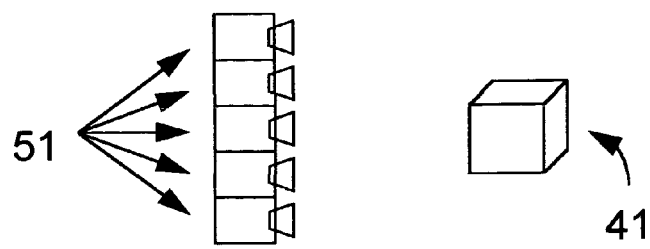
Figure 13:
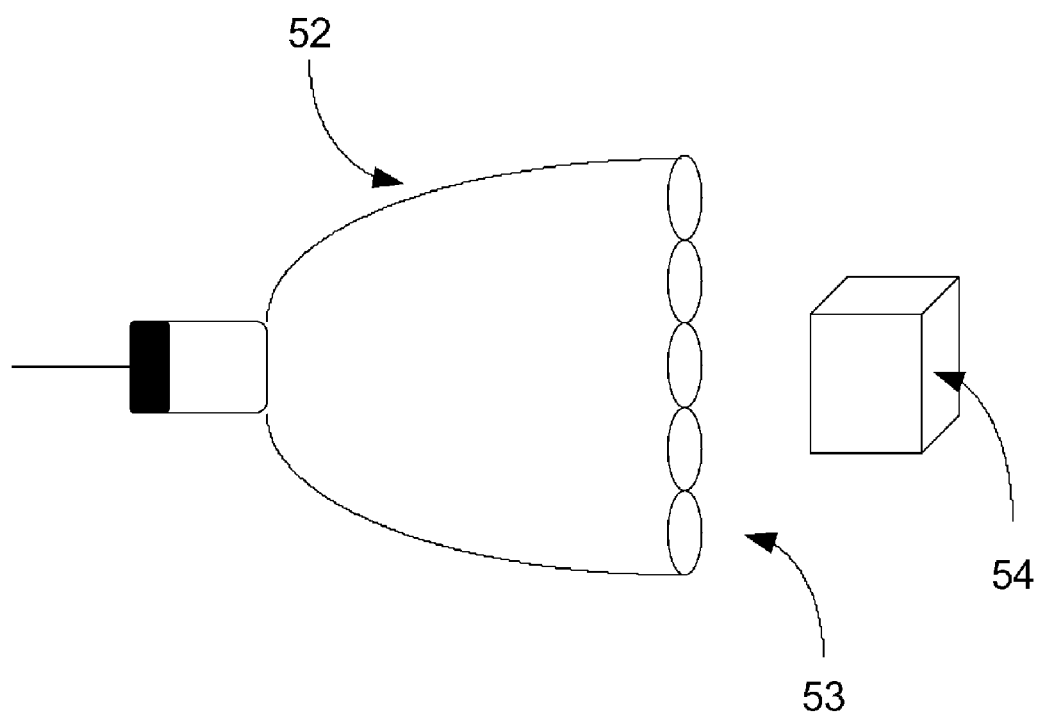
FIG. 13 is an illustration of the specialized CRT that produces a magnified three-dimensional image from the integral frame created in FIG. 12.

FIG. 12 and FIG. 13 illustrate a third embodiment of the Present Invention. In the third embodiment, magnification is accomplished by video means. In other words, a scanning electron beam is used for magnifying the integral frame instead of light. FIG. 12 shows three methods whereby a video integral frame may be produced from object or scene 41 using videography.

FIG. 12(a) shows a schematic for a specialized video camera 42. Light from 41 passes through matrix lens array 43 which is internal to camera 42. The light creates integral frame 44. Light from integral frame 44 then passes through condensing lens 45 which demagnifies the image and focuses it onto image orthocon or CCD 46. Image orthocon or CCD 46 converts the integral frame into an electronic signal. The electronics necessary to manipulate and transmit the electronic signal are well known and are not shown in the figure.

FIG. 12(b) shows how a conventional video camera may be used to accomplish the same result as can be achieved by the apparatus of FIG. 12(a). Here, matrix lens array 48 is mounted external to conventional video camera 47. Light from 41 passes through matrix lens array 48 to produce integral frame 49. Light from integral frame 49 passes through camera lens 50 and is demagnified and focused on image orthocon or CCD 46. Image orthocon or CCD 46 converts the integral frame into an electronic signal. The electronics necessary to manipulate and transmit the electronic signal are well known and are not shown in the figure.

FIG. 12(c) shows an alternate method for creating an integral frame from object or scene 41. In this case a matrix lens array is not used. Multiple conventional video cameras 51 videograph object or scene 41. Each of the cameras 51 produces an elemental image, the proper combination of which can produce an integral frame. In this case, the integral frame is synthesized electronically as a composite display of the elemental images. It should be noted that the integral frames produced by all three methods shown in FIG. 12 are identical. However, the method of FIG. 12(c) has the advantage of producing an integral frame having higher resolution than those produced by the other two methods.

FIG. 13 illustrates the specialized CRT 52 used for producing a magnified three-dimensional image. 2-dimensional magnification of the integral image is accomplished by means well known in the art. It is done by a scaling-up process. The larger the CRT, the greater the magnification factor. The key element is the bonding of matrix lens array 53 to the face of CRT 52 wherein array 53 is designed to match the magnified integral frame in such a way that one and only one elemental image is seen by one and only one element of the array and also in such a way that the separation characteristic and focal characteristic of the matrix lens array are calculated using the Principle of Magnification and Projection described earlier. Specialized CRT 52 with thus produce a magnified three-dimensional image 54 of object or scene 41 wherein magnification is uniform in all three dimensions.

Figure 14:
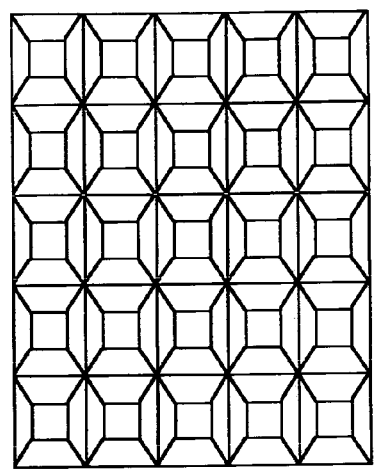
FIG. 14 is an illustration of a composite integral frame-magnifying array.
Figure 14:
Figure 14:
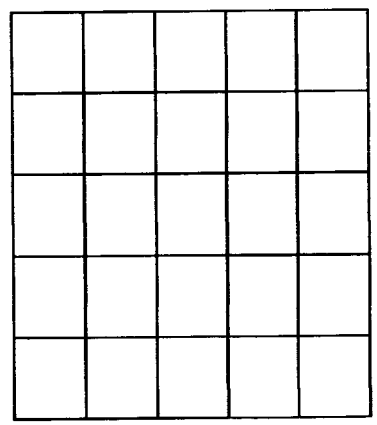
Figure 14:
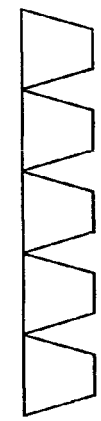

This Detailed Description Section has thus far described the Modular Integral Magnifier in its many embodiments wherein the magnifier is used in stand-alone mode. FIG. 14 shows how a plurality of Modular Integral Magnifiers can be combined to create a composite integral frame-magnifying array. FIG. 14(*a*) is a front elevational view of the assembly. It is this view that an observer would see. The appearance would be similar to that of a video wall that produces a composite video image larger than that available from a single CRT. However, in this case, a composite magnified three-dimensional image is produced of a single object or scene. Severe dimensional stability is only required in the direction perpendicular to the display of FIG. 14. Instability in this direction would produce unacceptable rotation of the magnified three-dimensional image. This would be exacerbated since the magnified image comprises component parts. Once aligned with each other, standard dimensional tolerance between the modules is sufficient to produce a coherent reconstructed image. Misalignment would produce the same type of image as seen as a reflection on a building with glass windows. However, this type of alignment is known in the art. FIG. 14(*b*) is a right side elevational view of the assembly, and FIG. 14(*c*) is a top plan view of the assembly. These views show that the perimeters of the adjacent large planar faces of the modules touch each other to produce the wall seen in FIG. 14(*a*). However, the small planar faces of the modules do not touch each other. There is sufficient room to attach optics or electronics to the small planar faces. Finally, FIG. 14(*d*) is a rear elevational view of the assembly. Here the small planar faces of all the modules may be seen by the observer as also may the module transmigrators.

The enlarged integral frames that form the composite three-dimensional image appear on the adjacent large faces of the modules. These adjacent enlarged output integral frames also appear to touch each other. However, the adjacent input integral frames do not touch each other. The composite image of the input integral frames is discontinuous. Each output integral frame is enlarged from its corresponding input integral frame. The distances between the centers of the input integral frames are the same as the distances between the centers of their corresponding output integral frames.

The assembly of FIG. 14 forms a screen whereby a viewer can observe a uniformly magnified orthoscopic three-dimensional image of a three-dimensional scene. If the modules are identical, as would be the case in the preferred embodiment, the final magnification of the entire three-dimensional image will be the same as that achieved by each individual module. However, using this method of magnification, it is possible to achieve even greater magnification. If the integral frames presented to the individual modules are themselves pre-enlarged using a first magnification factor and the modules then enlarge those input frames by a second magnification factor, then the final magnification factor would be the product of both magnification factors. This could be done by bonding a television or video monitor (e.g., a small LCD) to the input face of each module. In this case, pre-enlargement is performed within the television or video monitor.

Finally, the screen of FIG. 14 can be assembled from modules that do not have an output matrix lens array. In that event, a single continuous matrix lens array that encompasses the entire screen can be attached to the output end of every module. Doing this will provide additional stability and will serve to align the modules with each other to produce a coherent output image.

What is claimed is:

1. A device that produces a uniformly magnified image of a three-dimensional scene, the device being adapted to receive an input integral frame representing the three-dimensional scene unmagnified, said input integral frame comprising a plurality of elemental images arranged in a matrix having a separation characteristic and an image characteristic, wherein said device comprises:
   a) an input element adapted to receive the input integral frame;
   b) a transmigrator, having an input end and an output end, arranged to transmit and uniformly enlarge by a magnification factor the input integral frame to form an enlarged integral frame having an enlarged frame separation characteristic, wherein the ratio of the enlarged frame separation characteristic to the input frame separation characteristic is equal to the magnification factor; and,
   c) an output matrix lens array, having a focal characteristic and a separation characteristic wherein:
      i) the output lens array comprises a plurality of imaging elements equal in number and geometrically similar in arrangement as the elemental images of the enlarged integral frame;
      ii) the separation characteristic of the output lens array is equal to the separation characteristic of the enlarged frame;
      iii) the ratio of each element of the focal characteristic of the output lens array to the corresponding element of the image characteristic of the input frame is equal to the magnification factor; and,
      iv) each imaging element of the output array is arranged in fixed alignment with each elemental image of the enlarged integral frame.

2. The device of claim 1 wherein the input element is a surface.

3. The device of claim 2 wherein the surface is substantially planar.

4. The device of claim 2 further comprising an integral photograph affixed to the input element surface.

5. The device of claim 1 further comprising an output element to receive the second integral frame, said output element positioned between the transmigrator and the output lens array.

6. The device of claim 5 wherein the output element is a surface.

7. The device of claim 6 wherein the surface is substantially planar.

8. The device of claim 1 further comprising an input matrix lens array adapted to produce the input integral frame, said lens array being in fixed alignment with the input element, wherein:
   a) the input lens array comprises a plurality of imaging elements equal in number and geometrically similar in arrangement as the imaging elements of the output lens array;
   b) the input lens array has a separation characteristic equal to the separation characteristic of the input integral frame; and
   c) the input lens array has a focal characteristic;
   d) the ratio of the focal characteristic of the output lens array to that of the input lens array is equal to the magnification factor.

9. The device of claim 8 wherein at least one of the imaging elements of the input lens array is a refractive lens.

10. The device of claim 8 wherein at least one of the imaging elements of the input lens array is a reflective lens.

11. The device of claim 8 wherein at least one of the imaging elements of the input lens array is a diffractive optical element.

12. The device of claim 8 wherein at least one of the imaging elements of the input lens array is a holographic optical element.

13. The device of claim 8 wherein at least one of the imaging elements of the input lens array is a spherical lens.

14. The device of claim 8 wherein at least one of the imaging elements of the input lens array is formed from two or more crossed cylindrical lenses.

15. The device of claim 8 wherein at least one of the imaging elements focuses light or electromagnetic radiation in one and only one direction.

16. The device of claim 15 wherein at least one of the imaging elements of the input lens array is a cylindrical lens.

17. The device of claim 1 wherein at least one of the imaging elements of the output lens array is a refractive lens.

18. The device of claim 1 wherein at least one of the imaging elements of the output lens array is a reflective lens.

19. The device of claim 1 wherein at least one of the imaging elements of the output lens array is a diffractive optical element.

20. The device of claim 1 wherein at least one of the imaging elements of the output lens array is a holographic optical element.

21. The device of claim 1 wherein at least one of the imaging elements of the output lens array is a spherical lens.

22. The device of claim 1 wherein at least one of the imaging elements of the output lens array is formed from two or more crossed cylindrical lenses.

23. The device of claim 1 wherein at least one of the imaging elements focuses light or electromagnetic radiation in one and only one direction.

24. The device of claim 23 wherein at least one of the imaging elements of the output lens array is a cylindrical lens.

25. The device of claim 23 wherein some or all of the imaging elements of the output lens array are arranged linearly.

26. The device of claim 1 wherein some or all of the imaging elements of the output lens array are arranged in a rectangular matrix.

27. The device of claim 1 wherein some or all of the imaging elements of the output lens array are arranged in a hexagonally close packed matrix.

28. The device of claim 1 further comprising a television screen or video monitor affixed to the input element.

29. The device of claim 1 further comprising a means for projecting an integral frame being affixed to the input element.

30. The device of claim 29 wherein the integral frame is projected as an analog projection.

31. The device of claim 30 wherein projection is accomplished electro-magnetically.

32. The device of claim 30 wherein projection is accomplished optically.

33. The device of claim 29 wherein the integral frame is projected by scanning.

34. The device of claim 33 wherein the integral frame is projected digitally.

35. The device of claim 34 wherein a digital light processor chip is used to prepare the integral frame for projection.

36. The device of claim 33 wherein projection is accomplished electro-magnetically.

37. The device of claim 33 wherein projection is accomplished optically.

38. The device of claim 1 further comprising evening optics.

39. The device of claim 38 wherein the everting optics are affixed between the input element and the input end of the transmigrator.

40. The device of claim 38 wherein the transmigrator comprises the everting optics.

41. The device of claim 38 wherein the everting optics are affixed between the output end of the transmigrator and the output matrix lens array.

42. The device of claim 38 wherein the everting optics are affixed to the output matrix lens array.

43. The device of claim 38 wherein the everting optics is a matrix lens array.

44. A screen that produces a uniformly magnified image of a three-dimensional scene, comprising a plurality of magnifying devices arranged in a matrix, said magnifying devices each comprising:
   a) an input element adapted to receive an input integral frame, said integral frame comprising a plurality of elemental images arranged in a matrix and having a separation characteristic and an image characteristic;
   b) a transmigrator, having an input end and an output end, arranged to transmit and uniformly enlarge by a magnification factor the input integral frame to form an enlarged integral frame having an enlarged frame separation characteristic, wherein the ratio of the enlarged frame separation characteristic to the input frame separation characteristic is equal to the magnification factor; and,
   c) an output matrix lens array, having a focal characteristic and a separation characteristic wherein:
      i) the output lens array comprises a plurality of imaging elements equal in number and geometrically similar in arrangement as the elemental images of the enlarged integral frame;
      ii) the separation characteristic of the output lens array is equal to the separation characteristic of the enlarged frame;
      iii) the ratio of each element of the focal characteristic of the output lens array to the corresponding element of the image characteristic of the input frame is equal to the magnification factor; and,
      iv) each imaging element of the output array is arranged in fixed alignment with each elemental image of the enlarged integral frame.

45. The screen of claim 44 wherein the output matrix lens arrays of the magnifying devices are in contact with each other, edge to edge, to form an essentially continuous output array.

46. The screen of claim 44 further comprising a plurality of television screens or video monitors each affixed to the input element of each magnifying device.

47. The screen of claim 46 wherein the output matrix lens arrays of the magnifying devices are in contact with each other other, edge to edge, to form an essentially continuous output array.

48. A method for producing a uniformly magnified three-dimensional image of a three-dimensional scene from an input integral frame having a separation characteristic and an image characteristic, comprising:
   a) spatially separating the input integral frame into a plurality of component integral frames;

b) presenting each component integral frame to an input element of the magnifying device of the screen of claim 44 wherein each magnifying device receives only one component integral frame and wherein the logical arrangement of component integral frames remains the same as it was for the input integral frame prior to separation;

c) uniformly enlarging each component integral frame to produce an enlarged component integral frame wherein the enlarged component integral frame is in logical alignment with the component integral frame, and wherein with the center of each elemental image of the enlarged component integral frame is arranged in fixed alignment with the center of each corresponding imaging element of the output matrix lens array of the magnifying device of the screen of claim 44;

d) reconstructing component three-dimensional images from all of the enlarged component integral frames using the output matrix lens arrays of the magnifying devices of the screen of claim 44 wherein all of the component three-dimensional images form a single coherent uniformly magnified three-dimensional image of the three-dimensional scene.

49. The method of claim 48 further comprising optically everting the three-dimensional scene to produce the input integral frame.

50. The method of claim 48 further comprising processing the input integral frame so as to produce an orthoscopic uniformly magnified three-dimensional image from the three dimensional scene.

51. The method of claim 48 further comprising processing the component integral frames so as to produce an orthoscopic uniformly magnified three-dimensional image from the three dimensional scene.

52. The method of claim 48 further comprising processing the enlarged component integral frames so as to produce an orthoscopic uniformly magnified three-dimensional image from the three dimensional scene.

53. The method of claim 48 further comprising optically everting the magnified three-dimensional image to produce an orthoscopic uniformly magnified three-dimensional image from the three dimensional scene.

54. A screen that produces a uniformly magnified image of a three-dimensional scene, comprising a plurality of enlarging devices arranged in a matrix in contact with each other, edge to edge, to form an essentially continuous array, and single continuous output matrix lens array joined to all of the enlarging devices, wherein each enlarging device comprises:

a) an input element adapted to receive an input integral frame comprising a plurality of elemental images arranged in a matrix having a separation characteristic and an image characteristic;

b) a transmigrator, having an input end and an output end, arranged to transmit and uniformly enlarge by a magnification factor the input integral frame to form an enlarged integral frame having an enlarged frame separation characteristic, wherein the ratio of the enlarged frame separation characteristic to the input frame separation characteristic is equal to the magnification factor; and wherein:

i) the single continuous output matrix lens array comprises a plurality of imaging elements equal in number and geometrically similar in arrangement as the elemental images of the enlarged integral frame;

ii) the separation characteristic of the single continuous output matrix lens array is equal to the separation characteristic of the enlarged frame;

iii) the ratio of each element of the focal characteristic of the single continuous output matrix lens array to the corresponding element of the image characteristic of the input frame is equal to the magnification factor; and, iv) each imaging element of the single continuous output matrix array is arranged in fixed alignment with each elemental image of the enlarged integral frame.

55. The screen of claim 54 further comprising a plurality of television screens or video monitors each affixed to the input element of each enlarging device.

56. A device that produces a uniformly magnified image of a three-dimensional scene, the device being adapted to receive an input integral frame representing the three-dimensional scene unmagnified, said input integral frame comprising a plurality of elemental images arranged in a matrix having a separation characteristic and an image characteristic, wherein said device comprises:

a) a means for receiving the input integral frame;

b) a means for transmitting and uniformly enlarging by a magnification factor the input integral frame to form an enlarged integral frame having an enlarged frame separation characteristic, such that all of the parts of the input integral frame remain logically aligned with all of the corresponding parts of the enlarged integral frame, and wherein the ratio of the enlarged frame separation characteristic to the input frame separation characteristic is equal to the magnification factor; and, c) a means for reconstructing the three-dimensional image from the enlarged integral frame, said means having a focal characteristic and a separation characteristic wherein:

i) said means for reconstructing comprises a plurality of imaging means equal in number and arrangement as the elemental images of the enlarged integral frame;

ii) the separation characteristic of the means for reconstructing is equal to the separation characteristic of the enlarged frame;

iii) the ratio of each and every element of the focal characteristic to the corresponding element of the image characteristic of the input frame is equal to the magnification factor; and, iv) each of the imaging means of the means for reconstructing is arranged in fixed alignment with the center of each elemental image of the enlarged integral frame.

57. The device of claim 56 further comprising a means to produce the input integral frame, said means to produce being in fixed alignment with the means for receiving the input integral frame, wherein:

a) the means to produce the input integral frame comprises a plurality of imaging means equal in number and arrangement as the imaging elements of the output lens array;

b) the means to produce the input integral frame has a separation characteristic equal to the separation characteristic of the input integral frame; and c) the means to produce the input integral frame has a focal characteristic;

d) the ratio of the focal characteristic of the means for reconstructing the three-dimensional image to that of the means to produce the input integral frame is equal to the magnification factor.

58. A screen that produces a uniformly magnified image of a three-dimensional scene, comprising a plurality of enlarging devices arranged in a matrix in contact with each other, edge to edge, to form single continuous means for reconstructing the three-dimensional image joined to all of the devices, wherein each enlarging device comprises:
  a) a means for receiving an input integral frame comprising a plurality of elemental images arranged in a matrix having a separation characteristic and an image characteristic;
  b) a means for transmitting and uniformly enlarging by a magnification factor the input integral frame to form an enlarged integral frame having an enlarged frame separation characteristic, such that all of the parts of the input integral frame remain logically aligned with all of the corresponding parts of the enlarged integral frame, and wherein the ratio of the enlarged frame separation characteristic to the input frame separation characteristic is equal to the magnification factor;
  and wherein:
    i) said single continuous means has a focal characteristic and a separation characteristic;
    ii) said single continuous means for reconstructing comprises a plurality of imaging means equal in number and arrangement as the elemental images of the enlarged integral frame;
    iii) the separation characteristic of the single continuous means for reconstructing is equal to the separation characteristic of the enlarged frame;
    iv) the ratio of each and every element of the focal characteristic of the single continuous means to the corresponding element of the image characteristic of the input integral frame is equal to the magnification factor; and,
    v) each of the imaging means of the single continuous means is arranged in fixed alignment with the center of each elemental image of the enlarged integral frame.

59. A screen that produces a uniformly magnified image of a three-dimensional scene, comprising a plurality of magnifying devices arranged in a matrix, said magnifying devices each comprising:
  a) a means for receiving an input integral frame, said integral frame comprising a plurality of elemental images arranged in a matrix and having a separation characteristic and an image characteristic;
  b) a means for transmitting and uniformly enlarging by a magnification factor the input integral frame to form an enlarged integral frame having an enlarged frame separation characteristic, such that all of the parts of the input integral frame remain logically aligned with all of the corresponding parts of the enlarged integral frame, and wherein the ratio of the enlarged frame separation characteristic to the input frame separation characteristic is equal to the magnification factor; and,
  c) a means for reconstructing the three-dimensional image from the enlarged integral frame, said means having a focal characteristic and a separation characteristic wherein:
    i) said means for reconstructing comprises a plurality of imaging means equal in number and arrangement as the elemental images of the enlarged integral frame;
    ii) the separation characteristic of the means for reconstructing is equal to the separation characteristic of the enlarged frame;
    iii) the ratio of each and every element of the focal characteristic to the corresponding element of the image characteristic of the input frame is equal to the magnification factor; and,
    iv) each of the imaging means of the means for reconstructing is arranged in fixed alignment with the center of each elemental image of the enlarged integral frame.

60. The screen of claim 59 further comprising a plurality of means for producing a video image each affixed to the input element of each magnifying device.

61. The screen of claim 60 wherein the means for reconstructing the three-dimensional image of the magnifying devices are in contact with each other, edge to edge.

* * * * *